Jan. 12, 1960 M. V. KALFAIAN 2,921,133

PHONETIC TYPEWRITER OF SPEECH (RESPONSIVE TO ALL VOICES)

Filed March 24, 1958 9 Sheets-Sheet 1

BLOCK SYSTEM FOR TRANSLATING SPOKEN SOUNDS INTO TYPED SYMBOLS

INVENTOR.

Megan V. Kalfaian

Jan. 12, 1960 M. V. KALFAIAN 2,921,133

PHONETIC TYPEWRITER OF SPEECH (RESPONSIVE TO ALL VOICES)

Filed March 24, 1958 9 Sheets-Sheet 2

INVENTOR.

Alegner V. Kalfaian

PEAK A.G.C. FOR SPEECH SOUND WAVES

INVENTOR.

Mgur V. Kalfaian

INVENTOR.

Megrur V. Kalfaian

Jan. 12, 1960 M. V. KALFAIAN 2,921,133

PHONETIC TYPEWRITER OF SPEECH (RESPONSIVE TO ALL VOICES)

Filed March 24, 1958 9 Sheets-Sheet 5

INVENTOR.

Myron V. Kalfaian

INVENTOR.
Megur V. Kalfaian

PHONETIC TYPEWRITER OF SPEECH (RESPONSIVE TO ALL VOICES)

Filed March 24, 1958 9 Sheets-Sheet 7

INVENTOR.

Myron V. Kalfaian

PHONETIC TYPEWRITER OF SPEECH (RESPONSIVE TO ALL VOICES)

Filed March 24, 1958 9 Sheets-Sheet 8

INVENTOR.
Migran V. Kalfaian

United States Patent Office 2,921,133

Patented Jan. 12, 1960

2,921,133

PHONETIC TYPEWRITER OF SPEECH (RESPONSIVE TO ALL VOICES)

Meguer V. Kalfaian, Los Angeles, Calif.

Application March 24, 1958, Serial No. 723,510

14 Claims. (Cl. 178—31)

The present invention relates to the analysis of speech sound waves, and more particularly to methods and means for translating spoken phonetic sounds into discrete signals, during propagation of the sound for the actuation of symbol printing keys, for example, the keys of a modified electric typewriter or the slotted code bars of teletypewriter devices, so that spoken words may be translated into visual typed words. Its main object is to provide methods and means for the translation of spoken phonetic sounds into typed phonetic symbols, responsive to all qualities and ranges of voices.

In order that a machine, or the like, may be devised to simulate the interpretive mechanism of human intelligence, in printing spoken words, as spoken by all qualities and ranges of voices, without environmental control adjustments, or pre-adjustments to any particular voice, the machine must be capable of responding to, and performing as close as possible all the instantaneous analytical functions of the human brain. Of the many existing complexities, there are two separate conditions that must be considered in the analysis of spoken sound waves. The first condition is a function of producing pure phonetic sound, and the second condition is a function of adding character, or quality, to the sound. For example, a pure phonetic sound consists of a set of resonances whose ratios in frequency positions and amplitude levels one with respect to another remain constant, no matter what band of the voice spectrum they are produced in. The characterization frequency components, however, are inconsistent in form, and they vary in complex manner with the varying pitch (fundamental frequency) of the same speaker's voice.

*Definition of characterization complexities*

To define characterization complexities, let one speaker pronounce a certain phonetic sound (in natural voice) at first and second fundamental (pitch) frequencies. The listener can easily recognize the characteristic quality of the sound to be of the same speaker, at the same time recognizing the phonetic sound. But when the sound at the first fundamental is recorded and reproduced at the second fundamental (by speeding or retarding the time base of reproduction), the listener can easily detect the phonetic sound but cannot recognize the characteristic quality of the voice. I have advanced the concept of this peculiar condition by actual recordings of male and female voices on magnetic tape. The consonant sounds had been both preceded and succeeded by vowel sounds, and the reproduction speed had been varied randomly. In all cases, the phonetic sounds had been recognizable by a group of listeners, but the characterization qualities had been lost.

It is thus seen that the enormous variation of ordinary speech sound waves, with regard to complexities, are mostly caused by the characterization components, which change in form as the speaker's pitch changes.

If by some means these characterization frequency components could be removed from normal speech sound waves, then the wave patterns of each phonetic sound would have the same shape, regardless of the speaker's pitch; except of course, that these wave patterns would have different time bases.

*Information in a wave pattern and isolation of same*

Each pure phonetic sound comprises a repetition of substantially replica wave patterns, which are formed by the presence of a particular set of resonances. The succession of these wave patterns is effected by fairly regular puffs of air from the glottis, which are set into vibration in the momentarily formed resonant cavities of the vocal system. As each puff of air enters these cavities, an initial surge of pressure is formed, and each wave pattern is commenced by a high peaked wave, the series of occurrences of which, for convenience, we may call as major peaks of the propagated sound wave. Since the brain recognizes a phonetic sound regardless of the length of its duration, and since a phonetic sound comprises a repetition of replica wave patterns, it is then logical to say that (also proven by experiment) a single wave pattern contains all the information necessary for phonetic sound analysis. Thus, a wave pattern may be isolated from the propagated speech sound waves, for analysis, by selecting the wave portion between two major peaks.

*Graphical records of wave patterns*

Selection of wave patterns is accomplished by dividing the propagated wave into sections between successive major peaks. These major peaks are determined by a special type of device which for example, will produce marker square waves coincident with the major peaks, as indicated in the illustration of Fig. 5, wherein, an oscillogram of the sound "N" of a male voice is shown in the upper portion of the drawing (read the time base from right to left), and the square waves, as produced by the major peak selecting device, are shown in the lower portion of the drawing, coincident with the major peaks *p1*, *p2*, *p5*, *p8*, etc. It will be noted from this drawing that the successive wave patterns may change in shape due to enviromental conditions of the speaker's voice, but the intelligibility of the pure phonetic sound will remain unchanged as long as the particular set of resonances representing the particular phonetic sound remain unchanged.

*Necessity for standardizing the time bases of wave patterns*

The problem, therefore, is to provide methods and means for stretching and compressing these isolated wave patterns, in a manner that, all wave patterns of different phonetic sounds, as spoken by different pitched voices, will have the same time base. In this manner, the basic resonances of each phonetic sound, regardless of the speaker's pitch, would be located in a standard region of the voice spectrum, for analysis and recognition of the phonetic sound.

*Method for standardizing the time bases of wave patterns*

Modern electronic techniques provide us with such methods and means for transposing the time bases of these varying wave patterns to a desired standard time base. For example, the illustration in Fig. 5 indicates that it is possible to isolate each wave pattern individually. Assume then that one wave pattern is selected (during propagation of the sound wave) and recorded on a number one recorder, and the succeeding wave pattern is selected and recorded on a number two recorder. While the first recording is processed, its time length (from inception to termination of the wave pattern) is measured and stored in the form of a first signal quantity. Then, while the second recording is processed on the number two recorder, the first recorded wave pattern is reproduced under control of the first signal quantity, so adjusted that, the first recorded wave pattern is reproduced in a predetermined standard time base. The same process is repeated with the second recorded wave pattern, so that the end result is a cyclic reproduction of the wave patterns of the propagated sound wave at a standard time base. In order to allow time for reproduction of the recorded wave patterns prior to the arrival of successive wave patterns, the standard time base may be adjusted to be several times shorter than the shortest time base occurring in ordinary speech sound waves. Thus, the number of reproduced wave patterns will be many more (randomly varying) than the actual recorded wave patterns; which is at an advantage for more accurate analysis of the wave patterns.

*Limited bandwidths in which groups of basic resonances are found*

In most of the vowel sounds, the groups of basic resonances representing these sounds are repeated twice, and sometimes three times; particularly occurring in very low pitched voices. This condition may be proven by filtering out either the upper or lower half portion of the entire frequency bandwidth in which the particular phonetic vowel sound had been spoken. The listener can easily recognize the spoken phonetic sound from either one of the unfiltered portions of the sound wave; but cannot recognize the characteristic quality of the voice, since as stated previously, elimination or shifting in position of an appreciable number of frequency components from the voiced sound waves deteriorates the voice color. Also, as stated in the foregoing, the characterization frequency components are different than those repeated basic resonances; and are somewhat intermixed with the basic resonances. The first group of basic resonances, however, appear to be more distinguishable than the secondary ones, and accordingly, selection of the first group seems to be more desirable for translation into visible intelligible indicia. In some unvoiced fricatives, for example, the consonant sound "S," recognition of the phonetic sound lies entirely in the upper band of all the produced frequency components; but still only a portion of the entire bandwidth is essential for synthetic analysis of the sound. We may thus conclude from these experiments that, the frequency spacings between the basic resonances will be much closer one with respect to another, than expected in view of the large number of frequency components associated with each spoken phonetic sound wave.

*System of phonetic sound recognition*

Up to this point it had been described that when the time bases of the arriving wave patterns are standardized, the frequency locations of the basic resonances can be standardized for selection of same. Further, the characterization frequency components can be separated from the basic resonances due to their locations in separate frequency regions. This particular condition is helpful in selecting the basic resonances more accurately than it would be the case when the characterization frequency components were completely intermixed with the basic resonances. Thus for phonetic sound recognition, it is only necessary to employ resonant circuits separately responsive to as many as basic resonances that occur in all phonetic sounds, and operate a relay system by the outputs of these resonant circuits, in a manner that, sets of relays produce discrete output signals representative of pre-known phonetic sounds only when the total number of relays in each set are operated simultaneously. These discrete signals are then applied to the symbol printing keys of a modified electric typewriter, or the slotted code bars of a Teletype device, for printing the appropriate phonetic symbol representative of the spoken sound. In actual operation, however, means will also be provided for adjusting the relative amplitude levels within wide limits at the outputs of said sets of resonant circuits, so that the final operation of said sets of relays associated with the sets of resonant circuit will also depend upon predetermined ratios of amplitude levels of said sets of basic resonances. In furtherance of the system, there will be provided means for spacing the typed words so that they may be segregated during visual reading of the words. These and other details of the system, and more particularly the advantages of the system will be apparent from the following detailed specification of illustrative embodiment of the invention, when considered in connection with the drawings, in which:

*System of translating spoken words into typed words*

Figure 1:
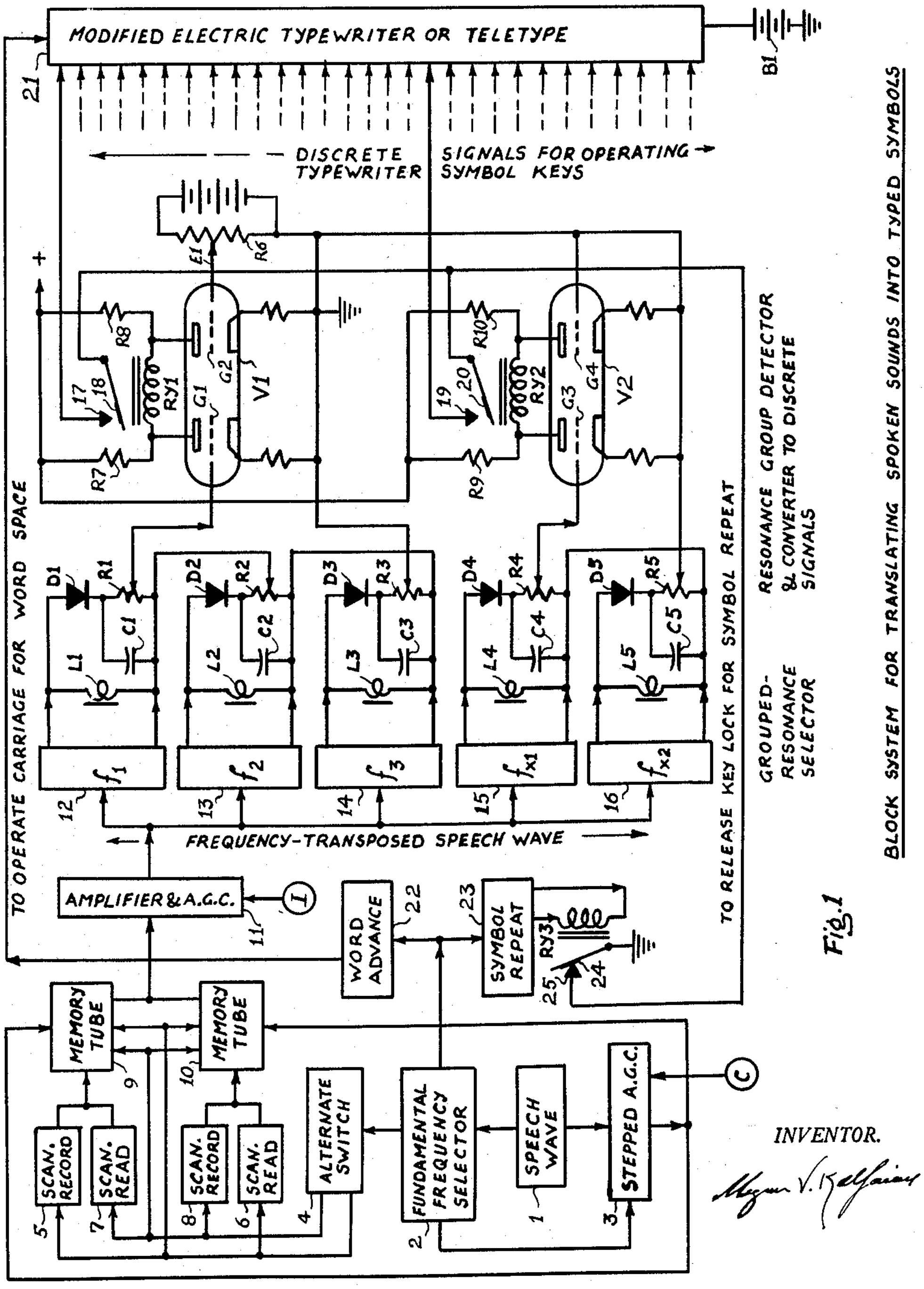
Fig. 1 is partly block diagram of the complete system of speech typewriter.

Fig. 1 shows, in partly block diagram, the apparatus and circuits for translating spoken phonetic sounds into printed phonetic symbols. The arrangement in this apparatus is divided into a sequence of frequency transposition; grouped resonance selection; resonance group detection and conversion into discrete signals; and a typing device for printing the proper phonetic symbols. This also includes an arrangement for word spacing on the typed sheet, and a device for repeat-printing of a phonetic symbol in a word, when so spoken, as often pronounced in some of the international languages. Frequency transposition is accomplished by the combination of blocks 1—10 and amplifier 11; grouped resonance selection is accomplished by the resonant circuits tuned to $f_1$, $f_2$, $f_3$, and $f_{x1}$, $f_{x2}$ in blocks 12—14, 15—16; resonance group detection is accomplished by detecting the voltages arriving from inductances L1—L3, L4—L5 across RC networks comprising R1—R3, R4—R5 and C1—C3, C4—C5, in series with rectifier diodes D1—D3, D4—D5, respectively; conversion into discrete signals is accomplished by combining and pre-adjusting the voltage ratios across grouped resistors R1—R3 and R4—R5, so that the total of any grouped voltages will either equal E1 or zero for operating any one of the relays RY1—RY2, and producing discrete signals across the contact points 17—18, 19—20 of their armatures, by way of vacuum tubes V1, V2; and the typing of phonetic symbols is accomplished by a modified electric typewriter or a Teletype device 21, the electric keys of which are excited by the discrete signals in pre-arranged order. Block 22 is utilized to produce an electrical signal after the ending of each spoken word, for operating the carriage of the typewriter, so that proper spacing between typed words can be provided. Similarly, when a word is spoken with the repetition of the same phonetic sound successively, as is often pronounced in some languages, the block 23 is provided to open the ground connection of armature lever contact points of relays RY1, RY2 temporarily, by its associate relay RY3 and contact points 24, 25, for releasing the self-locking action of an already depressed key of the typewriter 21, and printing of the same phonetic symbol successively in a printed word.

Referring now to the section of frequency transposition, the speech sound waves originating from block 1, are first applied to the block of fundamental frequency selector 2, and to the block of stepwise automatic gain control device 3. The function of the fundamental frequency selector is to produce at its output pulse-signals coincident with the termination of each arriving wave train (wave pattern of the speech sound waves). These pulse-signals are applied to an alternate switch 4, which alternates its state of operation at each arriving signal-pulse, and imparts the operation of a two section scanning system comprising blocks scan-record 5, scan-read 6, and scan-read 7, scan-record 8, alternately in relative time periods with the arriving wave patterns in block 1. With each section of the scanning system is associated a memory device, block 9 or block 10, which is provided for recording and reproducing the original sound waves by the scanning action, for example, of scan-record block 5 and scan-read block 7. The memory devices 9 and 10 are set into recording or reproducing (reading) action by the alternate output voltages of the alternate switch 4, in an arrangement that, when memory device 9 is in recording position, for example by scan-record block 5, the memory device 10 is in reading position of a previously recorded wave pattern, for example, by read-scan block 6, and vice-versa. Thus, the original wave patterns are successively recorded and read in alternate sequence upon and by the memory devices 9 and 10.

Prior to recording action, the original speech sound waves in block 1 are first applied to a stepwise gain control block 3, which equalizes the output amplitude of each successive input wave pattern individually before application upon the memory devices 9 and 10 for recording. The combined output of memory tubes 9 and 10 is then applied upon the input of amplifier 11, for amplification to a useful magnitude.

The frequency-transposed speech sound wave from the output of amplifier 11 is applied to a large number of resonant circuits, a small number of which is shown in the diagram by blocks 12 to 16. The selected resonances are pre-determined, and are formed into groups, for example, the resonances $f_1$, $f_2$, $f_3$ representing one group, and the resonances $f_{x1}$, $f_{x2}$ representing another group. The resonances in each group represent the basic resonances as produced in a spoken phonetic sound. Thus, the grouped resonances $f_1$, $f_2$, $f_3$ represent one phonetic sound, and the grouped resonances $f_{x1}$, $f_{x2}$, represent another phonetic sound. The resonant voltages appearing in each group, for example, across inductances L1—L3 as one group, and L4—L5 as another group, are amplitude detected individually across RC networks comprising R1—R3, R4—R5 and C1—C3, C4—C5, through rectifier diodes D1—D3, D4—D5, respectively. As described in the foregoing, both the frequency ratios and amplitude ratios of the basic resonances in a phonetic sound are constant; the latter ratios lying between wide limits. By frequency-transposition, the resonances in blocks 12—14, 15—16 are rendered fixed. The amplitude ratios of the detected voltages, however, are pre-adjusted to fixed values across resistors R1—R3, R4—R5, by their movable contact levers, as shown (the adjustments of these fixed amplitude ratios may also be accomplished by varying the impedances of the resonant coils L1—L5). These detected voltages of pre-fixed amplitudes are then so combined that, a singular voltage value for each group of voltages may be obtained, representative of a particular phonetic sound. For example, assume for the first group that the taps across R1—R3 are pre-adjusted to make all detected voltages of equal and predetermined amplitude, for example, equal to the bias potential E1, as adjusted across variable resistor R6. By combining the voltages across R2 and R3 in opposite polarities, zero voltage is obtained. By further combining this zero voltage with the detected voltage across R1, the end voltage will then be equal to E1, both of which are applied in like polarity to the opposite control grid elements G1 and G2 of a double triode vacuum tube V1. When these two grid elements have received like potentials of equal amplitudes, the cathode to plate current flow in each section of the double triode will equalize and de-energize relay RY1, the latter of which will release its armature 18 and make electrical contact with the contact point 17. This contact closure will cause circulation of electrical current through a particular key-operating-relay in the typewriter 21, through battery B1, by way of ground connection received from the normally closed contact points 22 and 23 of relay RY3 associated with symbol repeat block 24, and consequently operate a pre-assigned key for printing the appropriate phonetic symbol. In the event that a group may contain only two resonances, then the voltages across R4 and R5 may be combined in opposite polarities to make the end voltage zero, and this applied to one control grid G3 of a double triode vacuum tube V2, and the other grid G4 connected directly to ground; without the bias potential E1 associated with the previous example. Thus, when the grid G3 receives zero potential from R4, the equalized cathode to plate currents in both sections of V2 de-energize relay RY2, and release its normally pulled armature 20 which in turn makes electrical contact with the contact terminal 19, and finally effect the typing of another appropriate phonetic symbol by the typewriter 21. The sensitivities of relays RY1 and RY2 may be pre-adjusted for broadening their operational limits. By these various examples, it is seen that the required fixed adjustments are: Tuning the resonances of inductances L1—L3, L4—L5, etc.; adjusting the voltage-dividing taps across resistors R1—R3, R4—R5, etc.; and combining the detected voltages in a prescribed manner. These fixed pre-adjustments, of course, necessitates some approximate amplitude standardization of the incoming speech signals. This standardization is accomplished by the amplifier block 11, which contains automatic gain control system, to be further described.

In typing spoken words, it is usually desirable that spacing between words be provided. This is accomplished by the word-advance block 22. As described in the foregoing, a phonetic sound consists of a train of substantially replica wave patterns. The repetition frequency rate of these wave patterns is determined by repeated puffs of air from the glottis, which is variable, and ranges a frequency rate from 60 to 600 repetitions per second. In pronouncing a whole word, however, the minimum time that the physical elements can go through in making a complete cycle of change in position is not less than 1/10 second. Consequently, the puffs of air must stop functioning, for at least 1/10 of a second before a succeeding word is pronounced. Since the fundamental-frequency selector in block 2 is capable of producing marker signals at the arrival of each succeeding wave pattern, these marker signals are applied to the block 22, which in turn measures the time periods of these marker signals. When the time period of any of these marker signals exceeds $\frac{1}{10}$ second, then the word-advance block 22 transmits a signal pulse to the typewriter device 21 for operating and advancing its carriage a letter space.

The symbol-repeat block 23 is included for use in international languages. In some languages, for example, in Arabic language, the same phonetic sound is often repeated in the pronouncement of a word, although the letter or symbol is not repeated in writing. In many cases, the letter is accented in writing, indicating that the sound has to be repeated in pronouncing it. This is not the same as prolonging a vowel sound, such as practiced in the English language. There is a drop in power level between the pronouncement of the repeated sounds, and consequently a short pose occurs in the production of wave patterns. The time period of this short pose will be at least twice as long as the longest wave pattern, but not as long as the pose period between spoken words. Accordingly, the symbol-repeat block 23 is also pre-adjusted to measure the time periods between the arriving marker signals from fundamental frequency selector block 2. In this case, however, when any of these time periods is around $\frac{1}{20}$ second (this time period is adjusted experimentally for best results), the symbol-repeat block 23 operates relay RY3, which in turn breaks the normally closed ground connection (at its armature contact points 24 and 25) upon any one of the operating relay contacts 17—18 or 19—20 of relay RY1 or RY2, for a short time interval, of a symbol successively in a spoken word. This particular section, of course, may be eliminated if so desired.

The arrangement of relays RY1, RY2 may be different than shown in the drawing. For example, the resistors R7—R10 may be eliminated and center taps brought out from the relay inductances to the plate supply potential, so that the like-currents passing through half sections of these relay inductances will buck out the magnetic pull of their armature levers 18 and 20. In another arrangement, the relays RY1, RY2 may be connected in the cathode circuits of vacuum tubes V1, V2, instead of the plate circuits. Also, the cathode circuit resistors, as shown, may be eliminated if so desired, as these resistors are included for limiting the relay currents, when necessary, but not essential with the proper choice of component parts. Such changes, of course, are familiar to the skilled in the art of electronics, and further examples need not be given herein. Few modifications, however, are worth mentioning, and references are made to Figs. 2–4.

*Circuit modifications*

Figure 2:
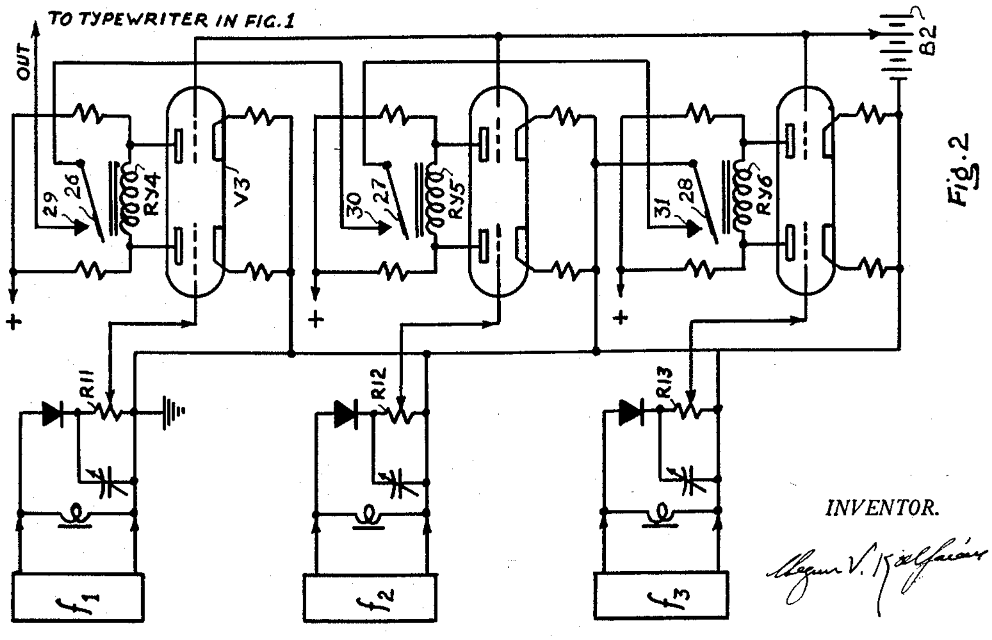

As pointed out in Fig. 1, the detected voltages across R1—R3, R4—R5, are combined in a prescribed manner (each group separately) to produce singular signal potentials. Various modes may be utilized in combining these voltage signals, one mode of which is shown in Fig. 2. In this arrangement, the detected voltages of pre-adjusted values developed across resistors R11—R13 (for one group) are separately applied to one of the control grids of double triode vacuum tubes V3—V5, respectively. The voltage ratios across resistors R11—R13 are so preadjusted that, when the basic resonances of a particular phonetic sound are all present, during articulation of the sound, the voltages across R11—R13 are of equal and pre-known amplitude. By pre-adjusting the bias potential from battery B2 equal to last mentioned amplitude, and applying in parallel upon the opposite control grids of vacuum tubes V3—V5, the relays RY4—RY6 will all de-energize (by way of balanced plate currents passing through both sections of the double triode vacuum tubes V4—V6) and release their normally pulled armature levers 26—28; effecting closure with their contact points 29—31, respectively. When all these contact points are closed, a closed circuit is established, and the contact terminal 29 receives ground potential for the operation of electric typewriter in Fig. 1, in the previously described manner.

Figure 3:
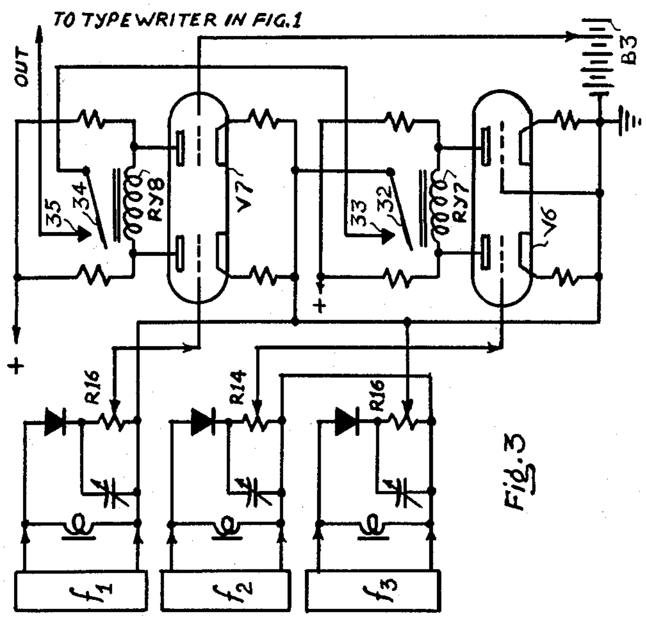
Figs. 2–4 are circuit modifications of the basic resonance selectors and converters to discrete signals for typewriter operation.

Fig. 3 shows another arrangement which could be utilized with equal efficiency, as with the previous arrangements described above. In Fig. 3, the detected signal voltages across R14 and R15 are combined in opposite polarities, so that zero voltage is obtained at the voltage dividing contact point across R14, and applied upon one of the control grids of double triode vacuum tube V6. The other control grid of this tube is connected to ground, so that when zero voltage is received from R14, the cathode to plate currents of both sections of the double triode V6 will be balanced to de-energize relay RY7 and release the normally pulled armature lever 32; making contact with the contact point 33. The amplitude of detected signal voltage across R16 is preadjusted equal to the normal bias battery B3, so that when these equalized potentials are applied upon the control grids of double triode V7, separately, the plate currents of both sections will be balanced and de-energize relay RY8; releasing its normally pulled armature contact lever 34 toward contact 35. Thus, when both relays RY7 and RY8 are deenergized simultaneously, the contact terminal 35 receives ground potential for the operation and printing an appropriate phonetic symbol by the typewriter in Fig. 1.

Figure 4:
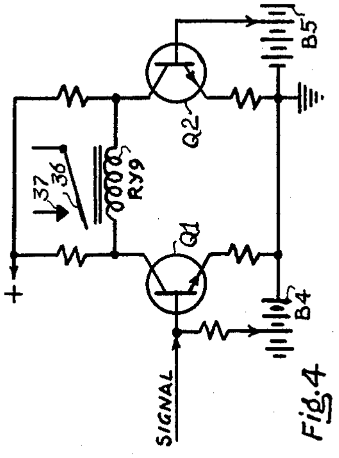

With the exemplary arrangements given above, it is also wished to be stated herein, that, the circuitry is not limited to the use of vacuum tubes, as shown, but also to transistors, as practiced in the conventional art. An exemplary circuit is shown in Fig. 4, wherein, transistors Q1 and Q2 are utilized. The circuitry is similar to the circuits shown in previous arrangements, for example, transistors Q1 and Q2 are normally biased in different values, by batteries B4 and B5, so that the normally unbalanced currents through Q1 and Q2 will energize the relay RY9, pulling its armature 36 away from the contact point 37. Thus, when the signal potential of pre-determined amplitude arrives at the base element of Q1, the emitter currents of both Q1 and Q2 are balanced, which cause de-energization of relay RY9, for the operation of the typewriter 21 in Fig. 1, in the same manner as described by way of the previously given examples.

Up to this point the general theory and system of translating spoken words into typed words has been described in a broader sense. The detailed circuitry of each step will now be given as in the following.

*Fundamental frequency selector*

As described in the foregoing, fundamental frequency or pitch of the spoken phonetic sound is referred to the trains of wave patterns, the time periods of which determine one cycle periods of the fundamental frequencies. As also mentioned in the foregoing, selection of these one cycle envelopes of the fundamental, or wave patterns, is achieved by selection of the major peaks of the propagated sound wave, as marker signals of the arrival and ending of the wave patterns. Reference to major peak selection may be made to my related U.S. Patents No. 2,613,273, Oct. 7, 1952; No. 2,673,893, March 30, 1954; and No. 2,708,688, May 17, 1955. Also to my latest improvement of fundamental frequency selection in my patent application Serial No. 684,205, Sept. 16, 1957; over which further improvements are made by the presently disclosed fundamental frequency selector.

Figure 5:
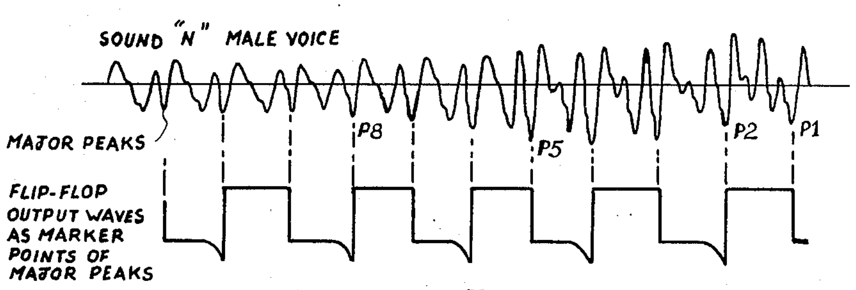
Fig. 5 is a part oscillogram of the phonetic sound "N," and a square wave showing the positions of the major peaks which terminate the successive wave patterns.

Fig. 5 shows an oscillograph of the sound "N" (read the time base from left to right), the major peaks of which are designated as *p1*, *p2*, *p5*, *p8*, etc., and marked coincident with the square waves drawn immediately below the sound waves. The major peaks between *p1* and *p5* are quite distingushable, but between *p5* and *p8*, they start declining with possible cause of error in selecting these major peaks. The device as described herein, however, is contemplated to select these major peaks with greater accuracy than the drawing of Fig. 5 appears to provide.

Figure 6:
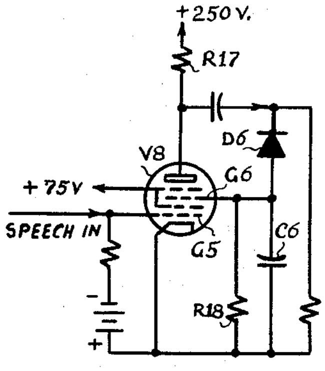
Fig. 6 is a schematic showing the basic circuitry for major peak selection.
Figure 9:
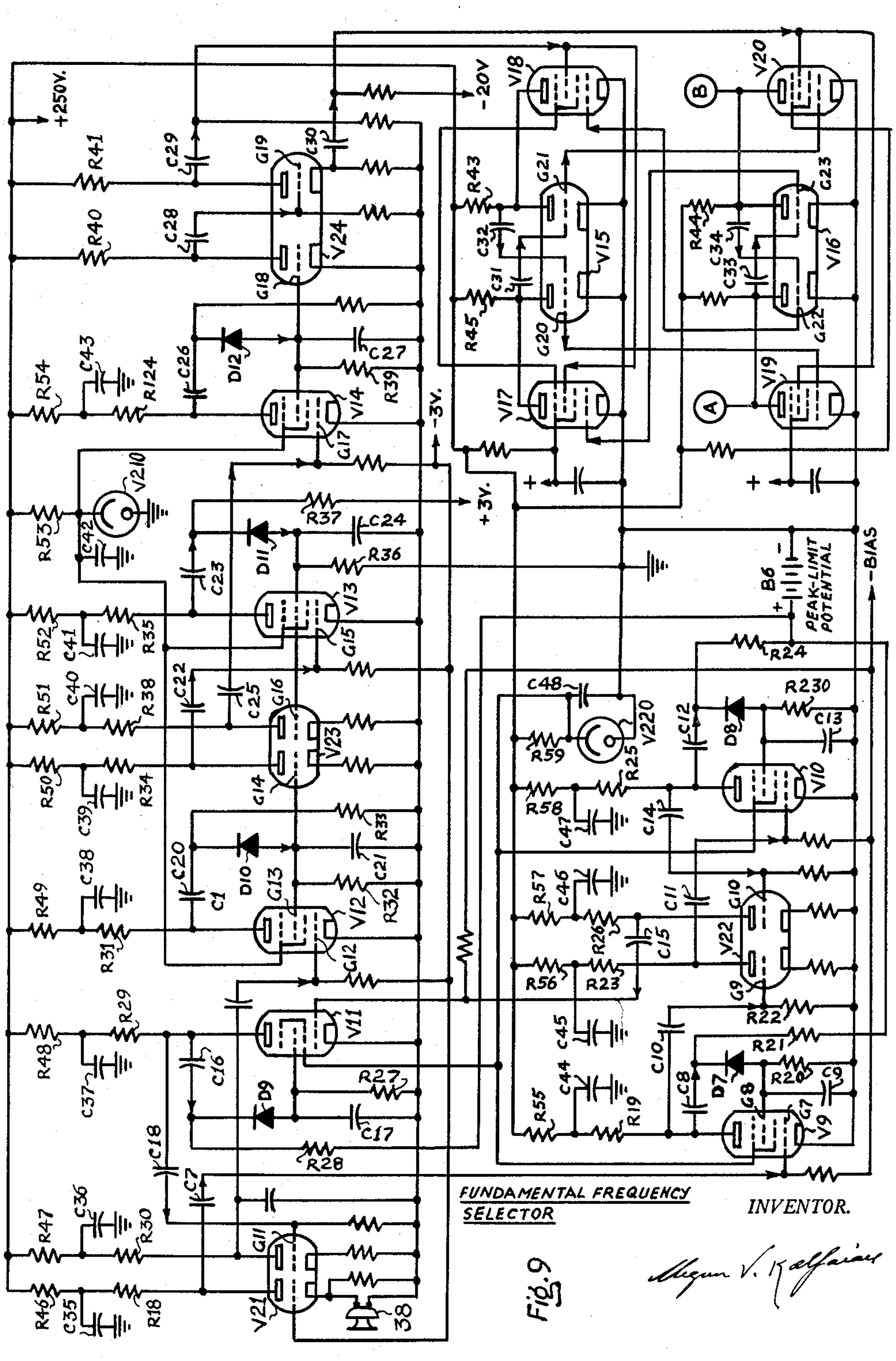
Fig. 9 is the complete schematic for major peak selection.

The basic principles of operation of the fundamental frequency selector, as shown in Fig. 9, may be best described by the simplified circuit in Fig. 6. In this arrangement, assume first that the electron tube V8 is of the commercially available type 5915, which contains two separate electron intensity control grids G5 and G6, so that its plate conductance as well as the transconductance may be controlled by any one of these two control grid elements. One of the control grids, for example, G6, is zero biased with respect to the cathode element, and the other grid, for example, G5, is biased at three volts negative with respect to the cathode element. The normal three volt negative bias renders this particular tube operate at a nonlinear curve of the grid-versus-plate swing with minimum transconductance. In this state of the arrangement, assume that a sine wave of three volts peak is applied to the grid G5, the voltage of which is amplified in the plate circuit resistance R17, This amplified voltage is rectified through rectifier diode D6 and applied upon the control grid G6 in degenerative direction. During the positive excursion of the input sine wave at G5, the transconductance of the tube increases, while at the same time the rectified voltage applied upon G6 decreases the transconductance. Here it will be noted that the greatest degenerative feedback would occur at the peak of the input sine wave at G5; but since at this point the bias at G6 had been driven highly negative, the voltage at G6 and R18 drops to maximum negative until the tube becomes almost nonconductive. In this degenerative feedback process, the feedback negative voltage charges in parallel connected capacitor C6 suddently, and decays gradually, keeping the tube transconductance low, so that further positive swing (minor peaks) upon grid G5 does not cause appreciable feedback voltage from across R17, until the negative voltage at G6 has resumed close to cathode potential. The net result is that, first, during the initial degenerative feedback a maximum negative potential is developed across C6, with greatly reduced excitation immediately thereafter, and second, the magnitude of initial charge across C6 becomes almost identical with different amplitudes of applied sine wave voltage upon grid G5, since as stated, the amplified potential across R17 causes maximum swing of the tube transconductance even with small voltage swing upon the input grid G5.

Figure 7:
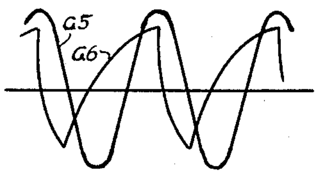
Figs. 7 and 8 are waveforms involved in the operation of this circuit.
Figure 8:
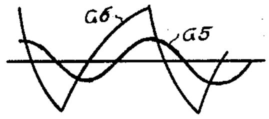

To illustrate graphically the waveform differences between control grid terminals G5 and G6, Figs. 7 and 8 show two different operating conditions. The graph at Fig. 7 shows a sine wave of three volts peak applied upon the control grid G5, and the resultant wave at G6. The graph in Fig. 8 shows how the amplitude of the voltage waveform obtained at the control grid G6 is increased with respect to the sine wave voltage of small amplitude applied upon the control grid G5. Both the amplitudes and waveforms of the applied and derived potentials in Figs. 7 and 8 are drawn approximately proportionally, so as to show the peak exaggeration and instantaneous gain control action of the arrangement in Fig. 6. The duties imposed upon grids G5 and G6 may be reversed with equivalent operational results.

The graphical illustrations in Figs. 7 and 8 indicate that complete amplitude control is not obtainable from a single stage of the arrangement given in Fig. 6. Since enormous variation occurs in the amplitude of normal speech sound waves, it is desirable that more than a single stage of the arrangement of Fig. 6 is used for selection of the major peaks.

Fig. 9 is the complete schematic for selecting major peaks of the spoken sound waves. In this arrangement, there are used three stages of automatic gain control circuits comprising tubes V9—V11; three stages of major peak selector circuits comprising tubes V12—V14; and a flip-flop trigger circuit comprising cross-coupled trigger tubes V15—V16, and associated excited tubes V17—V20. The function of automatic gain control circuits is substantially the same as of the major peak selector circuits, but with different control adjustments, and the function may be described as in the following:

Referring to Fig. 9, the spoken speech sound wave is received by a microphone 38, the voltage variations of which are amplified in the plate circuit resistor R18 through cathode excitation of a double triode vacuum tube V21. The signal voltage developed across R18 is coupled, through capacitor C7, to the first control grid G7 of the first gain-control tube V9. The positive going signal in this tube is amplified across the plate circuit resistor R19, and fed back to the second control grid G8 in negative direction, through coupling capacitor C8; diode D7; and parallel connected RC circuit comprising R20, C9. The RC time constant of R20 and C9 is pre-adjusted much longer than the time constant adjusted for major peak selection, so as to average out the wide variation of amplitude changes in longer time than necessary for major peak selection. The amount of feedback, however, is made small, so that the required amount of gain control is obtained by several stages, for better peak regulation. This is done by choosing a small value for the resistor R19. For peak amplitude control, the negative feedback voltage from R19 is normally biased at a positive potential across battery B6, through load resistor R21, so that gain-control voltage is not fed back to the control grid G8 of V9 until the negative feedback voltage is higher than the positive bias voltage of B6. Thus the storage capacitor C9 charges negatively when the feedback voltage from across resistor R19 exceeds the bias potential of B6, and discharges through R20 gradually until another feedback voltage arrives for recharging.

Due to the pre-fixed polarity of diode D7, it is noted that only positive going input signal is utilized for gain control operation. Thus, the output signal of each gain control circuit must be first phase inverted before applying to a succeeding gain control circuit. This is done by applying the voltage signal from across R19 to one of the control grids G9 of double triode tube V22, through coupling capacitor C10 and load resistor R22. This applied signal potential is phase inverted across plate circuit resistor R23, and coupled to the first control grid V10 through coupling capacitor C11. The circuitry and function of gain control tube V10 is similar to the circuitry and function of gain control tube V9, and accordingly, further description is not necessary herein. The feedback component parts, however, are: coupling capacitor C12; rectifier diode D8; parallel connected RC circuit comprising R230, C13; and positive bias connecting resistor R24. In a similar mode, as described above, the feedback voltage developed across plate circuit resistor R25 of V10 is applied to the control grid G10 of double triode V22, through coupling capacitor C14, for phase inversion across the plate circuit resistor R26. This phase inverted signal potential across resistor R26 is applied to the first control grid of a third stage of gain control tube V11, through coupling capacitor C15. The circuitry and function of this third stage is also similar to the circuitry and function of gain control tubes V9 and V10, and accordingly, further description is not necessary to be given herein. The feedback component parts, however, are: feedback coupling capacitor C16; rectifier diode D9; parallel connected RC circuit comprising R27, C17; and positive bias connecting load resistor R28.

For the function of major peak selection, the negative feedback signal voltage developed in the plate circuit resistor R29 is first phase inverted in the double triode V21. This is done by coupling the signal voltage across R29 to the control grid G11 of V21, through coupling capacitor C18. The phase inverted signal voltage across plate circuit resistor R30, of this tube, is applied to the first control grid G12 of the first major peak selector tube V12 through coupling capacitor C19. This applied signal-potential is amplified in the plate circuit resistor R31, and fed back in degenerative direction to the second control grid G13 of V12. The feedback loop is accomplished through coupling capacitor C20; diode D10; and parallel connected RC circuit comprising resistor R32 and capacitor C21. Unlike, in the amplitude control circuitry of the first three stages, comprising tubes V9—V11, the feedback signal voltage is zero biased through resistor R33; instead of the positive bias from across battery B6. Also, the input signal-potential upon the first control grid G12 is amplified in large magnitude in the plate circuit resistor R31 before being fed back to the second control grid G13. The circuitry and function of this stage has already been described by way of the example given in Fig. 6, and also by the graphical illustrations in Figs. 7 and 8. Accordingly, further descriptive matter is not necessary herein. As a brief reminder, however, the selected major peak is obtained at the second control grid G13, by way of fast charging and slow discharging action of C21. As stated in the foregoing, only the positive going signal impressed upon the first control grid, for example, G12 of V12, is effective for feedback and major peak selection. Accordingly, for each additional stage of feedback major peak selection the output signal (stored signal-potential at the second control grid G13 of V12) must be phase inverted before being applied to the succeeding stage. Thus, the output of V12 (the second control grid G13 of V12) is directly connected to the control grid G14 of phase inverter tube V23, and the phase inverted signal potential across plate circuit resistor R34 is applied to the first control grid G15 of the second stage of major peak selector tube V13, through coupling capacitor C22. The circuitry and function of this stage (V13) is similar to the circuitry and function of the first stage of major peak selector tube V12, and accordingly, further description is not necessary to be given herein. The feedback loop component parts, however, are: plate circuit resistor R35; feedback coupling capacitor C23; rectifier diode D11; and parallel connected RC circuit comprising resistor R36 and capacitor C24. In this second stage of major peak selection, the feedback signal voltage is normally biased 3 volts positive through load resistor R37, as shown. This small bias is found useful, in practice, for cancelling out some spurious noise voltages. However, the advantage is not great enough to render the arrangement absolutely necessary, and this positive bias may be dispensed with, if so desired.

For the third stage of major peak selection, the output negative major peak voltage developed across C24 of V13 is applied to the control grid G16 of phase inverter tube V23, and the phase inverted major peak voltage across plate circuit resistor R38 is applied to the first control grid G17 of the third stage major peak selector tube V14 through coupling capacitor C25. The circuitry and function of the third stage of major peak selector tube V14 is similar to the first and second stages of major peak selector tubes V12, V13, and also to the exemplary arrangement described by way of the circuit given in Fig. 6. Accordingly, further descriptive matter is not necessary herein. The feedback component parts, however, are: plate circuit resistor R124; feedback coupling capacitor C26; rectifier diode D12; and parallel connected RC circuit comprising resistor R39 and capacitor C27.

The final negative major peak voltage obtained across C27 is applied to the control grid G18 of the amplifier section of double triode V24, and the amplified major peak voltage across plate circuit resistor R40 is applied to the control grid G19 of the phase splitting section of double triode V24. The amplified major peak voltage impressed upon the control grid G19 of V24 is produced in positive polarity across cathode circuit resistor R42 and in negative polarity across plate circuit resistor R41 of tube V24. These positive and negative major peak voltages from across R42 and R41 are applied to the parallel connected second control grids of V19—V20 through coupling capacitor C30, and to the parallel connected second control grids of V17—V18 through coupling capacitor C29, respectively. These latter tubes are used as the exciter tubes of cross coupled flip-flop circuit comprising trigger tubes V15 and V16, the function of which may be described as in the following:

Assume initially that the plate supply potential is applied upon the tube V15. The unloaded storage capacitors C31 and C32 will charge, through conductance of grids G20 and G21, to the plate supply potential. But due to plate to grid cross coupling between the two sections of V15, one section will conduct and supply a large negative bias upon the control grid of the other section; thus effecting a stable conducting and nonconducting condition of the double triode V15. The same condition relates to the double triode tube V16, by way of the cross coupled storage capacitors C33 and C34.

The trigger tubes V15 and V16 are cross coupled one with respect to the other by way of the mixer tubes V17—V18 and V19—V20, in the following manner: The control grid G22 of V16 is directly connected to the first control grid of V18, and the control grid G23 of V16 is directly connected to the first control grid of mixer tube V17. Similarly, the control grid G20 of V15 is directly connected to the first control grid of mixer tube V19, and the control grid G21 of V15 is directly connected to the first control grid mixer tube V20. In this state, the second control grids of mixer tubes V19 and V20 are normally biased to plate current cut off, and the second control grids of mixer tubes V17 and V18 are zero biased. Thus, assuming that the left handed section of trigger tube V16 is conducting, driving G22 at zero bias, and driving G23 at negative cut-off bias, the mixer tube V18 becomes conductive and draws plate current through plate circuit resistor R43. The current draw across R43 applies cut-off negative bias upon the control grid G20 of V15, and the right handed section of the double triode V15 becomes conductive, rendering the left handed section non-conductive. When the negative major peak voltage arrives upon the second control grids of mixer tubes V17 and V18, these tubes are rendered inoperative without affecting the state of operation of the trigger tube V15. While simultaneously, when the positive major peak voltage arrives upon the second control grids of mixer tubes V19 and V20, these tubes become conductive, but since the first control grid of V19 is at negative cut-off bias by direct connection with the grid G20 of V15, the mixer tube V20 becomes conductive and draws plate current through resistor R44. The current passing through R44 applies negative cut-off bias upon the control grid G22 of the left handed section of V16, rendering the right handed section conductive and the left handed section of V16 non-conductive. When the positive and negative major peak input signals cease to zero, the mixer tubes V19 and V20 again become idle and the mixer tubes V17—V18 operating. At this point, however, the first control grid of V18 has received negative cut-off bias by direct connection with the grid G22 of V16. Accordingly, V18 becomes nonconductive and V17 conductive; the latter tube drawing plate current through resistor R45. When current passes through R45, a large negative bias is applied upon the control grid G21 of V15, rendering the right handed section of trigger tube V15 non-conductive and the left handed section conductive. Thus, each time the major peak input signals arrive at the flip-flop circuit just described, the trigger tube V16 changes its state of conductance, and at the end of the input signals the trigger tube V15 changes its state of conductance. This flip-flop action will produce square wave voltages, such as shown in Fig. 5, and may be obtained from any one of the plate circuits, for example, at the plate output terminals (A) and (B).

It might be well to note that the arrangement as given in Fig. 9 is sensitive to 60 cycle noise, and the plate supply voltage must be well filtered. For convenience, each stage is shown with separate filtering, for example, by the resistors R46—R59 and bypass capacitors C35—C48. The gaseous regulator tubes V210 and V220 have also been used in practice with more stable operation of the circuit, but they are not absolutely necessary and may be dispensed with, if so desired. It will also be of note to mention that, the number of stages for controlling the amplitude of the sound waves, and the number of stages used for selecting the major peaks may be different than shown in the arrangement of Fig. 9, as any number of stages may be utilized according to the requirements of a particular use. Also, the flip-flop circuit utilizing tubes V15—V20 may be of conventional design if so desired. Furthermore, the arrangement in Fig. 9 may utilize transistors, instead of vacuum tubes, without sacrificing functional operation. For example, the tetrode transistor will be suitable in replacing the gain-control and major-peak-selecting vacuum tubes.

In reference to the system arrangement as given in Fig. 1, and according to the specification in the foregoing, it is desirable that the output waves of amplifier 11 be of constant and predetermined amplitude. Also in order that better signal-to-noise ratio is obtained from the output of memory tubes 9 and 10, it is desirable that the original sound waves be passed through automatic gain control circuitry, for, example, in block 3, prior to application upon the memory devices 9 and 10. Such automatic gain control circuitry is described by way of the arrangement given in Fig. 9, for example, by the three stage gain control circuitry utilizing tubes V9—V11. The disadvantage of this circuit however, is first, the discharging effect of the storage gain control signal which deteriorates the original sound signal, and second, the unidirectional gain control which is not ideally suitable for the sound signals. A more suitable gain control system is given in Fig. 10.

*Peak A.G.C. for speech sound waves*

Figure 10:
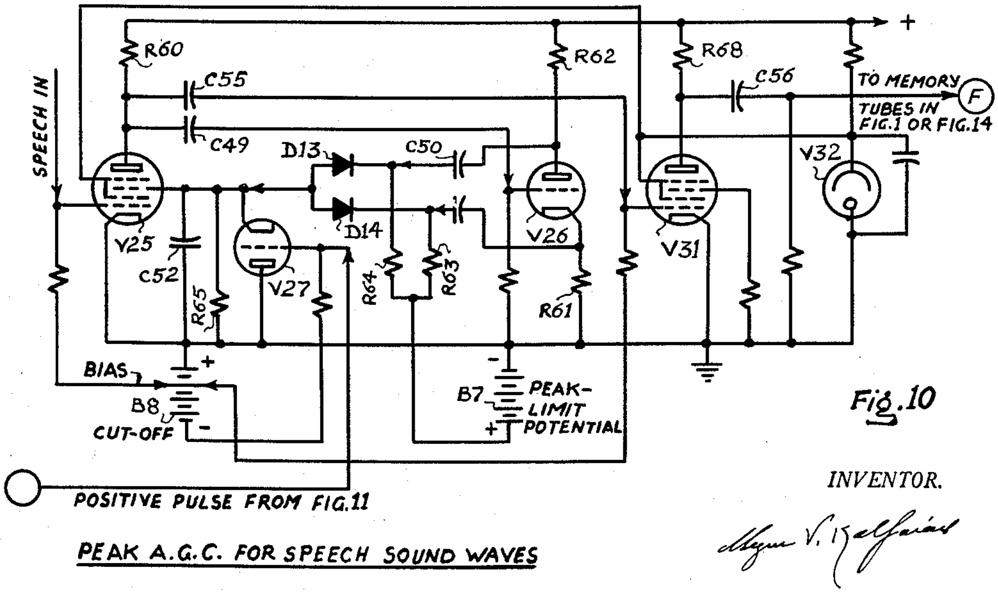
Fig. 10 is a schematic for stepwise automatic gain control of the original sound wave, for standardizing all the variable amplitudes to a predetermined amplitude.

In Fig. 10, the original sound wave is applied upon the first control grid of electron tube V25. This input signal appears in the plate circuit resistor R60, and further coupled to the control grid of phase splitting electron tube V26, through coupling capacitor C49. In this mode, the input signal is divided into positive and negative signals across cathode and plate circuit resistors R61 and R62, which are fed back to the second control grid of gain control tube V25, through coupling capacitors C50, C51, and rectifier diodes D13, D14. The polarity of diodes D13 and D14 is so arranged that, the second control grid of V25 receives rectified negative voltage regardless of the polarity of input sound signal at the first control grid of V25. The cathode terminals of diodes D13 and D14 are normally connected to the positive terminal of peak-limit-potential battery B7, so that current flows through diodes D13 and D14 when the negative feedback potential across load resistor R63 or R64 is higher than the potential across B7. When this feedback potential exceeds the predetermined amplitude of B7, the capacitor C52 charges negatively and reduces the transconductance of V25 to the required value. The parallel connected resistor R65 across C52 is not essential, and may be eliminated completely. When, utilized, however, its value is chosen very high, so that the discharge of C52 will be negligible. In this case, the discharge of C52 is accomplished by a parallel connected electron tube V27, which is normally rendered non-conductive by a high negative bias upon its control grid from battery B8. This discharger tube is made conductive by short positive pulses at major peak from the output of fundamental frequency selector in Fig. 9. The positive and negative output pulses from plate circuit terminals (A) and (B) of Fig. 9 are first applied to the control grids of V28 and V29 (in Fig. 11), which are normally rendered inoperative by the cut-off negative bias upon their grids from battery B9. Thus, when the input terminals (A) and (B) become positive and negative simultaneously, the tube (V28 or V29) that receives positive pulse upon its grid will conduct and draw current through the common plate circuit resistor R66. The negative voltage pulse developed across this resistor is applied upon the control grid of normally conductive tube V30, through coupling capacitor C53 which in turn becomes non-conductive and a positive pulse is developed across plate circuit resistor R67. This positive voltage pulse is coupled to an outgoing terminal (C), through coupling capacitor C54, and finally impressed upon the control grid of V27 in Fig. 10. The discharger tube V27 becomes conductive during the incoming positive pulse, and discharges the stored potential in capacitor C52, ready to be charged again according to the peak amplitude of the succeeding wave pattern of the incoming sound wave upon the first control grid of gain control tube V25. It is thus seen that the amplitude of each succeeding wave pattern will be equalized at the plate circuit resistor R60 of gain control tube V25. These amplitude equalized wave pattern voltages are then coupled to the control grid of amplifier tube V31, through coupling capacitor C55, and are amplified in the plate circuit resistor R68. These amplified signals are finally applied to the memory tubes in Fig. 1, through coupling capacitor C56, for recording purposes. As drawn in the arrangement, the stepped A.G.C. block in Fig. 1 represents the stepped gain control schematic arrangement in Fig. 10. In this latter arrangement, the amplifier tube V31 is shown to be of the dual grid control type, for the sole purpose that multiple number of gain control stages may be utilized, if so desired. Accordingly, the amplifier tube V31 may be of any type desired. The gaseous type voltage control tube V32 is included in the arrangement for stability of supply voltage variations, but may be dispensed with if so desired.

*Word separation and symbol repeat in typed words*

Figure 11:
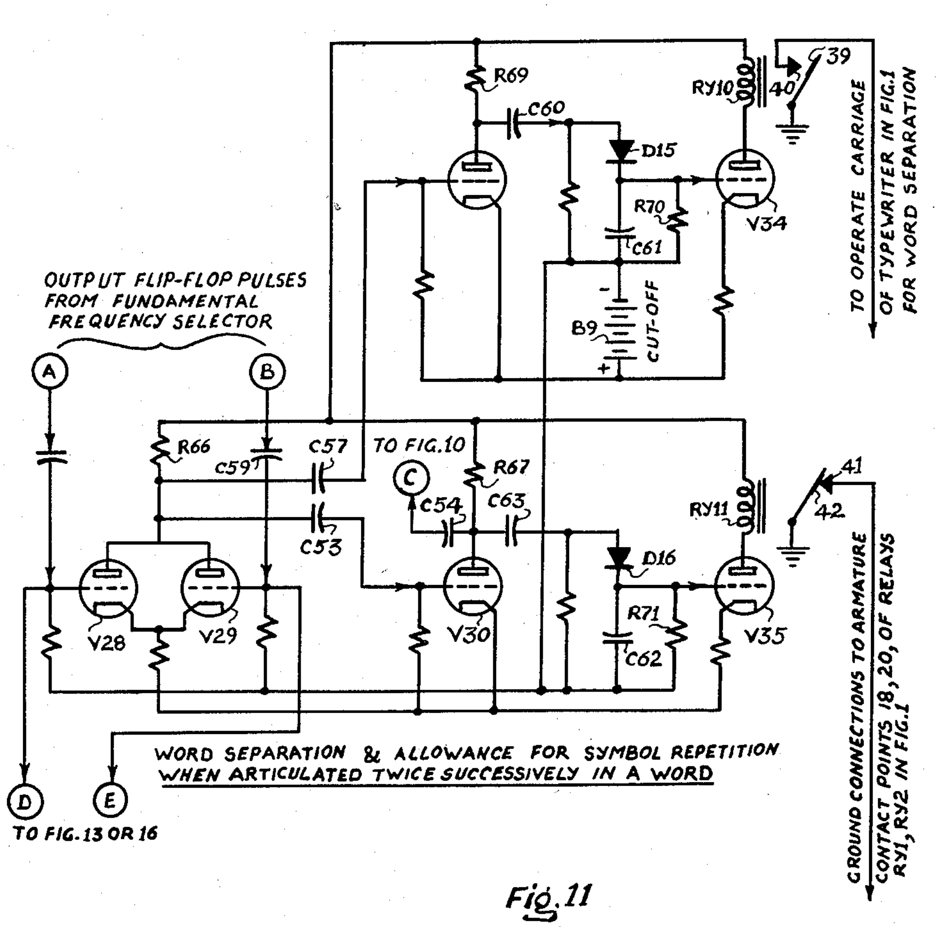
Fig. 11 is a schematic for recognition of the ending of each spoken word, so as to allow spacing after each typed word, and recognition of a successively repeated phonetic sound in a spoken word, so as to allow successive printing of the same phonetic symbol in a typed word.

Referring back to the system arrangement of Fig. 1, the blocks 22 and 23 had been included for word separation and symbol-repeat operation of the typewriter 21. The circuit arrangements of these block diagrams are shown in Fig. 11. For word separation the negative pulses from across R66 are applied upon the control grid of normally conductive tube V33, through coupling capacitor C57, and for symbol-repeat operation the negative pulses from across R66 are applied upon the control grid of normally conductive tube V30, through coupling capacitor C53. As described by way of Figs. 9 and 10, the negative pulses across R66 are obtained by the square wave voltages from plate circuit terminals (A) and (B) in Fig. 9. These square wave voltages are passed through small coupling capacitors C58 and C59, through terminals (A) and (B) in Fig. 11, which are changed to short pulses for operating the normally non-conductive tubes V28 and V29. Thus, the normal conductance of tubes V30 and V33 are reduced at short pulse intervals at the repetition rate of flip-flop operation in Fig. 9, the latter operation of which is effected by the successive repetition of wave patterns in the spoken sound waves. The positive pulses from across plate circuit resistor R69 (in Fig. 11) are applied to the control grid of electron tube V34, through coupling capacitor C60, and rectifier diode D15. This rectified positive voltage is charged across storage capacitor C61, the discharge time constant of which is determined by the parallel connected resistor R70. As noted in the drawing, the control grid of V34 is normally negative biased to plate current cut-off by the battery B9, so that the relay RY10 is normally in idle position. When rectified positive pulses are impressed upon the control grid of V34, the capacitor C61 charges and holds the grid of V34 at operating point to energize relay RY10 and close the contact points 39 and 40. The contact point 40 receives ground potential and operates the carriage of typewriter 21 in Fig. 1, for word spacing. Such an operation may be accomplished in different ways, for example, contact point 40 normally making contact with the ground and opening when tube V34 operates, or contact points 39 and 40 sending a pulse for the operation of the typewriter carriage, etc., these modes being familiar to the skilled in the particular art. The relay RY10 remains in operating position as long as positive pulses appear across the plate circuit resistor R69 of tube V33. When these pulses disappear, for about 1/10th second, the charge across storage capacitor C61 discharges through parallel connected resistor R70, and the electron tube V34 becomes non-conductive again, de-energizing relay RY10 for repetition of word spacing. Thus the time constant of RC circuit comprising capacitor C61 and R70 (adjusted experimentally for best results) determines the word spacing operation of the typewriter 21 in Fig. 1. In a similar mode, the time constant of RC circuit comprising capacitor C62 and resistor R71 determines the symbol repetition successively (in a word) by the typewriter 21 in Fig. 1. In this case, the time constant of the latter circuit is adjusted at about 1/20th second (this time being adjusted experimentally for best results), as repetition of phonetic sounds can be pronounced in much faster time period than syllables or words. The successive positive pulses, for symbol repetition, are produced across the plate circuit resistor R67 of tube V30, the pulses of which are impressed upon the control grid of normally inoperative tube V35, through coupling capacitor C63 and rectifier diode D16. The rectified positive pulses are stored in capacitor C62, the discharge time of which is determined by the parallel connected resistor R71. In operation, when relay RY11 (this relay is the same as relay RY3 in Fig. 1) energizes by conduction of tube V35, the contact points 41 and 42 open and relieve any one of the operated armature levers 18 or 20 of relay RY1 or RY2 in Fig. 1, of its ground connection, and consequently, the self locking action of the particular symbol printing key is released temporarily for repeat printing of successively pronounced phonetic sound in a word.

*Peak amplitude control of the frequency transposed sound waves*

Figure 12:
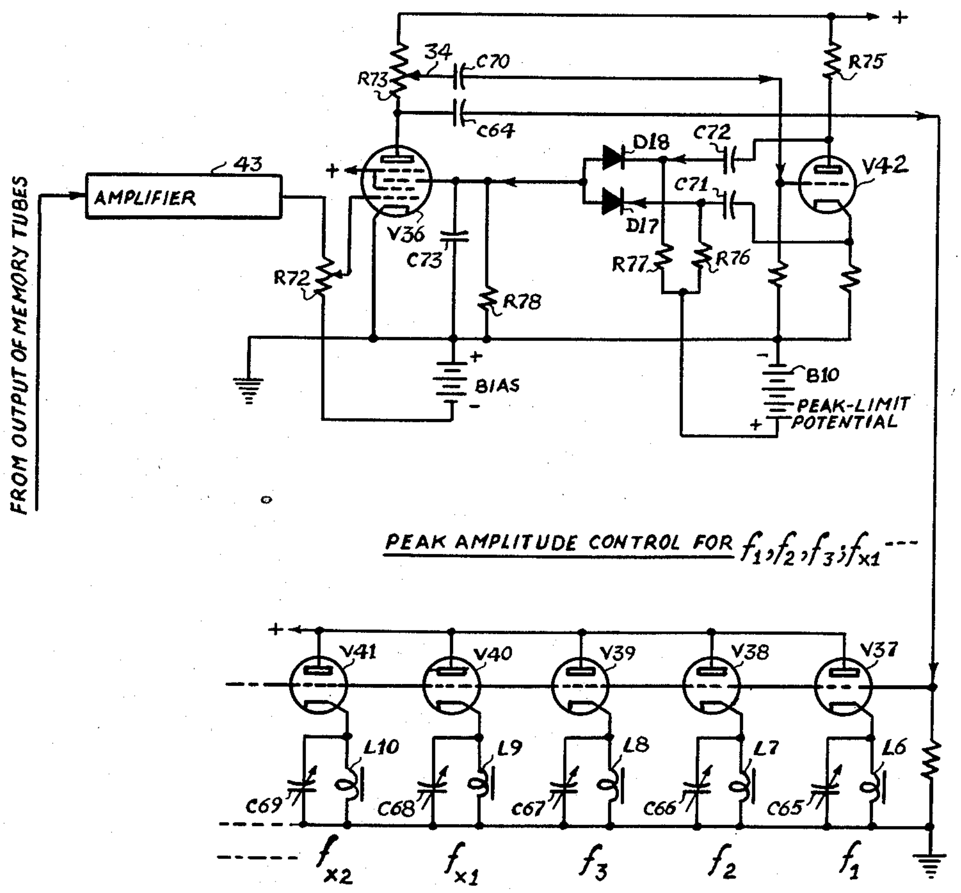
Fig. 12 is an automatic gain control of the frequency-transposed speech sound waves, and the resonance selector circuits associated therewith.

Referring back to the arrangement of Fig. 1, fixed amplitude ratio adjustments across R1—R5 had been indicated in the foregoing. These fixed adjustments may be made possible when the amplitude of the frequency-transposed sound wave at the output of amplifier block 11 is controlled. That is, the peak amplitude of the terminating waves of each succeeding wave pattern is of constant and predetermined amplitude. The amplifier block 11, therefore, requires an automatic gain control, such for example, as described in the foregoing by way of the arrangement given in Fig. 10. The actual arrangement, however, is given in Fig. 12. In this latter arrangement, the amplifier block 43 represents the same block as block 11 in Fig. 1, of conventional design. At the output of amplifier 43 is included an automatic gain control arrangement comprising dual grid control tube V36, the first control grid of which receives the output signal of amplifier 43, from the variable tap of resistor R72. This received signal is amplified in the plate circuit resistor R73, the amplified signal of which is applied upon the control grids of grouped resonance selector tubes V37—V39; V40—V41; etc., in parallel, through coupling capacitor C64. The grouped inductances L6—L8 and L9—L10, etc., represent the same inductances as L1—L3 and L4—L5, etc., in Fig. 1, and they are tuned to the selected resonances by capacitors C65—C67 and C68—C69, etc., the produced voltage signals across which are detected in a similar fashion as shown in Fig. 1. These resonant circuits are shown connected in the cathode circuits of tubes V37—V41, so as to avoid drift in amplitude, such as would usually occur when used in the plate circuits of these tubes for amplification purposes. The only amplitude control is achieved by the dual grid control tube V36. A pre-adjusted tap 84 across plate circuit resistor R73 of tube V36, transmits a part of the signal potential across R73 (of predetermined ratio) to the control grid of phase splitting tube V42, through coupling capacitor C70. This transmitted signal potential is split in phase in the cathode and plate circuit resistors R74 and R75, of V42, both of which are simultaneously applied upon the second control grid of gain control tube V36 through coupling capacitors C71, C72, and rectifier diodes D17, D18. The cathode terminals of diodes D17 and D18 are normally biased positive, through resistors R76 and R77, on battery B10, which determines the pre-fixed amount of amplification desired across plate circuit resistor R73 of tube V36. In other words, the amplification factor of amplifier block 43 is so adjusted that, the negative signal voltage received at any one of the cathode terminals of diodes D17, D18, is a little higher than the potential across B10, thus, a constant negative potential is applied upon the second control grid of tube V36, by way of diodes D17 and D18. This applied negative potential is stored in the storage capacitor C73, the discharge time constant of which is determined by the value of resistor R78. This discharge time constant is adjusted to be of long period, in the vicinity of seconds, since the only drift variations in this case, occur due to line voltage supply sources, and these are of slow variances. Stepwise gain control is not necessary in this section of the amplifier, since as described in the foregoing, the output amplitudes of memory tubes 9 and 10 in Fig. 1 had already been stepwise gain controlled by the block 3, a detailed description of which is given by way of the schematic in Fig. 10. Only a single stage of gain control, for example, by tube V36, is shown in the arrangement of Fig. 12, but more stages may be utilized, if so desired, such for example, as used in Fig. 9, by the three stages utilizing tubes V9—V11. Also, transistors may be used to replace the vacuum tubes, either for the gain-control tubes or resonance selector tubes V37—V41, etc.

*Scanning system*

The scanning action is imparted by the square wave switching action of the flip-flop trigger circuit in Fig. 9, comprising tubes V15—V20. The control grids of these tubes, however, are excited by major peak signals accompanied by some noise signals, and for this reason it is desirable that a buffer stage of flip-flop circuit be utilized; operated by the former flip-flop circuit. These flip-flop circuits divide the frequency of the input signal by two, and accordingly, the output frequency of the first flip-flop circuit must be multiplied by two prior to application upon the buffer stage flip-flop circuit. Thus, the output terminals (A) and (B) of the first flip-flop circuit in Fig. 9, are first applied to the control grids of mixer tubes V43 and V44, in Fig. 13 by way of the input terminals (D) and (E) connected common to the terminals (D) and (E) in Fig. 11. The control grids of V43 and V44 are normally negative biased to plate current cut-off value through grid circuit resistors R78 and R79. Thus, any one of the mixer tubes V43 or V44 receiving positive pulse upon its control grid produces a negative pulse in the common plate circuit resistor R80, and a positive pulse in the common cathode circuit resistor R81. These negative and positive pulses are applied upon the parallel connected second control grids of dual-control-grid tubes V45, V46, and parallel connected second control grids of dual-control-grid tubes V47, V48, through coupling capacitors C74 and C75, respectively. Thus, the buffer flip-flop circuit comprising trigger tubes V49, V50 and V51, V52, with their associated exciter tubes V45, V46 and V47, V48, operates in synchronism with the first flip-flop circuit in Fig. 9. The flip-flop circuit in Fig. 13 operates in the same fashion as the flip-flop circuit in Fig. 9. Accordingly, repeat description of its operation will be avoided herein.

Starting from an arbitrary operating point, assume that the trigger tube V50 has just started conducting and the trigger tube V49 non-conducting. At this point, the exciter tube V45 becomes non-conductive producing a positive pulse through its plate circuit coupling capacitors C76, C77, and exciter tube V46 becomes conductive producing a negative pulse through its plate circuit coupling capacitors C78, C79. The positive pulse produced through coupling capacitor C76 is applied upon the control grid of normally inoperative discharger tube V53, which becomes conductive during the short pulse period and discharges capacitor C80 from a previously stored charge. During this discharge period, the positive pulse produced through coupling capacitor C77 is applied simultaneously upon the control grids of normally inoperative tubes V54 and V55, which become conductive during the short input pulse time. When V55 becomes conductive, its plate conductance draws current through resistor R82 and drops the voltage at anode terminal of diode D19 equal to or below the potential of battery B11, so that the discharge of C80 becomes substantially complete. At the same time, the tube V54 becomes conductive during said pulse period, and draws current through resistor R83, causing drop in voltage, equal to or below the potential of battery B11, so that any voltage developed across cathode circuit resistor R84 of cathode follower tube V56 is not transferred through diode D20 to the storage capacitor C81, for storage. Simultaneously, the cathode potential of the conducting trigger tube V50 is directly coupled to the control grid of tube V57, so as to render it conductive and draw current through resistor R85. This current draw also drops the voltage across R85 below the potential of battery B11, so that charging of capacitor C81 is prevented through diode D21. The negative cut-off potential upon non-conducting trigger tube V49 is directly applied upon the control grids of tubes V58 and V59 simultaneously, rendering them also non-conductive.

*Scan during record period*

In this given state, the potential at anode terminal of diode D19 is at plate supply potential, so that the storage capacitor C80 is ready for charging through diode D19 in series with timing resistor R82. At the same time the anode terminal of diode D20 is at cathode potential of cathode follower tube V56, so that C81 is also ready for charging through diode D20 in series with resistor R83. In order that C81 may start charging from initial zero potential, the control tube V60 is chosen of the same type as of tube V56, and the cathode circuit resistor R86 is balanced with that of the cathode circuit resistor R84 of tube V56. Thus, the capacitor C81 is initially at zero potential. At this point, the capacitor C80 starts charging through diode D19, the rise time of which charge is determined by the predetermined value of the series connected resistor R82. The positive rising potential across charging capacitor C80 is directly applied upon the control grid of V56, and the same positive rising potential appears across the cathode circuit resistor R84 of this tube. The positive rising potential across cathode circuit resistor R84 of V56 is simultaneously transferred to the storage capacitor C81 through diode D20 in series with resistor R83. The RC time constant of series connected capacitor C81 and resistor R83 is made larger than the RC time constant of series connected capacitor C80 and resistor R82, so that only about 67 percent of the voltage rise across cathode circuit resistor R84 of cathode follower tube V86 is charged in capacitor C81. The rising potential across capacitor C81 represents the recording scan voltage applied to the electrostatic deflection plates of a recording and reproducing device, for example, a cathode beam memory tube, as represented by block diagram 9, in Fig. 1.

*Scan during read period*

The scan voltage across capacitor C81 keeps on rising until the flip-flop circuit changes its state of conduction. To describe this function, assume now that the trigger tube V49 of the flip-flop circuit becomes conductive and the trigger tube V50 of the flip-flop becomes nonconductive. At the start of this change, there are produced negative pulses through plate circuit coupling capacitors C76, C77, and positive pulses through plate circuit coupling capacitors C78, C79. The negative pulses through coupling capacitors C76 and C77 of tube V45, do not produce useful results. The positive pulses through coupling capacitors C78 and C79 produce useful results, but they are associated with the alternate scanning arrangement, which is typically the same in function, as presently described in reference to the first section. At this time, the positive potential upon control grid of conducting trigger tube V49 is directly applied simultaneously upon the control grids of tubes V58 and V59, which become conductive. The plate conductance of V58 draws current through resistor R82 and drops the voltage below potential of battery B11, thus further charging of capacitor C80 stops, and the potential so far stored in capacitor C80 remains unchanged in steady state. The plate conductance of V59 draws current through resistor R83 and drops the voltage below the potential of battery B11, thus further charging of capacitor C81 also stops. In a further operation, the negative potential upon non-conducting trigger tube V50 is directly applied upon the control grid of V57, which becomes non-conducting and the anode terminal of diode D21 assumes the cathode potential of cathode follower tube V56. At this time, due to the potential across storage capacitor C81 being lower than the potential across cathode circuit resistor R84 of cathode follower tube V56, the capacitor C81 starts charging further through diode D21 in series with resistor R85. The rising potential across cathode circuit resistor R84 is applied to the control grid of cathode follower V61, and the rising potential across storage capacitor C81 is applied to the control grid of cathode follower tube V62. Across the cathode terminals of cathode circuit resistors R87 and R88 of cathode follower tubes V61 and V62, are connected a series circuit comprising resistor R89 and rectifier diode D22. The resistor R89 is connected to a voltage dividing tap across resistor R87, and this tap is so adjusted that only 67 percent of the voltage developed across R87 is transferred to the resistor R89. Also, the polarity of diode D22 is so arranged that when the voltage across R88 is higher than the voltage at the tap across R87, current passes through diode D22 and resistor R89. With these adjustments, it is apparent that the voltages at the cathode terminal of V62 and at the voltage dividing tap across R87 are of the same value at the time when C81 starts charging in series with the diode D21 and resistor R85. Thus, when C81 starts charging a little higher than this value, current passes through diode D22 and the positive voltage developed across R89 is applied to the control grid of V63 through coupling capacitor C82. This input voltage is amplified in negative polarity in the plate circuit resistor R90 of V63, and further amplified in positive polarity in the plate circuit resistor R91 of amplifier tube V64, by way of coupling the voltage across R90 to the control grid of V64 through coupling capacitor C83. The highly amplified positive potential across plate circuit resistor R91 of V64 is applied through coupling capacitor C84, upon the normally idle discharger tube V65, which becomes conductive and discharges the capacitor C81, for a new start of scan charge. While discharger tube V65 is made conductive for discharging the capacitor C81, the same positive signal is applied to the control grid of tube V66, through coupling capacitor C85, the plate current of which passes through R85 and drops the voltage at anode terminal of diode D21 below the potential of battery B11; this voltage drop allowing substantially complete discharge of the capacitor C81. Simultaneously, the amplified positive potential across plate circuit resistor R91 of V64 is applied to the control grid of V67, which further ampiifies this signal in negative polarity across its plate circuit resistor and transmits to the memory tube in block 9 of Fig. 1, for blanking the scanning beam during fly back return, through coupling capacitor C87. The coupling capacitors C83—C87 are chosen of small value, so that the voltage received from R89 and diode D22 is changed to short pulse, for shortening the discharge time of the capacitor C81.

When the capacitor C81 discharges, the voltage across cathode resistor R88 of V62 becomes lower than the voltage at the voltage dividing tap across resistor R87 of V61, and accordingly, the capacitor C81 starts recharging through diode D21 and series connected resistor R85. The RC time constant of C81 and resistor R85 is pre-adjusted much shorter than the RC time constant of capacitor C81 and resistor R83, so that the reading scan time is much shorter than the record scan time. Of course, the reading scan time should be accurately tuned, so that the resonances $f_1$, $f_2$, $f_3$, etc. in Fig. 1 can be tuned accordingly. Such tuning of the capacitor C81 may be made either by the parallel connected tuning capacitor C88, or by varying the resistor R85. Thus, as long as the flip-flop circuit remains idle, the stored potential across C80 remains in steady state and the capacitor C81 keeps charging and discharging in the form of saw tooth waves, and at higher frequency rate than when the same capacitor had charged during the record scan time.

During the production of reading scan voltage across C81, the negative potential upon non-conducting trigger tube V50 of the flip-flop circuit, has by direct coupling upon the control grids of tubes V68 and V69 rendered them non-conductive, so that the capacitor C89 starts charging through rectifier diode D23 in series with resistor R93. This voltage charge is applied to the control grid of cathode follower tube V68, and transferred across the cathode circuit resistor R94. In further operation, this latter voltage is transferred across the storage capacitor C90, through rectifier diode D24 and in series with resistor R95, so that during the reading scan voltage developed across capacitor C81, for reading the recorded sound signal upon memory tube 9, in Fig. 1, the scan voltage developed across C90 is applied upon the memory tube 10 in Fig. 1, for recording the succeeding wave pattern of the applied sound waves. Thus, each section of the scanning system in Fig. 13, operates in alternate periods and in identical fashion, so that when one wave pattern of the sound wave is being recorded on one memory tube, the previously recorded wave pattern on the other memory tube is read at a greater (predetermined) frequency rate than originally recorded. The alternate section of the scanning system in Fig. 13 being identically the same as just described, no further description is, accordingly, necessary.

During quiescence period of the incoming speech sound waves, one of the storage capacitors C80 or C89 will keep on charging to the plate supply potential. This large potential will be applied to the control grid of cathode follower V56, or V68, which may be damaged in time. To avoid such large voltage upon the grids of these tubes, the rectifier diodes D25 and D26 are utilized. The anode terminals of diodes D25 and D26 are connected to the cathode terminals of resistors R84 and R94, of V56 and V68, respectively. The cathode terminals of these diodes are connected in parallel and to a pre-adjusted (non-critical) voltage dividing tap across the resistor R96, in series with resistor R97; this voltage tap being bypassed by the capacitor C91. When the positive voltage across any one of the cathode circuit resistors R84 or R94 exceeds the voltage tap across resistor R96, current passes through one of the diodes D25 or D26 in series with the resistor R97, and the positive voltage developed across this resistor is applied, through coupling capacitor C92 to the control grid of V69. This voltage is amplified in negative polarity in the plate circuit resistor R98 of V69, and further applied to the control grid of normally inoperative tube V70 through coupling capacitor C93. The conductance of V70 passes current through the plate and cathode resistors R80, R81, and consequently effect operation of the flip-flop circuit for repetition of the charging action of capacitors C80 and C89, alternately, until sound signal arrives again at the input of the system.

Reference is made to the effect of slower charging rate of the capacitor C81 than the original charging of the capacitor C80. This is particularly important due to the reason that, during the charging of capacitor C81 the cathode potential of V56 must be about 33 percent higher than the actual potential that the capacitor is required to be charged for scanning; so as to utilize only the linear portion of voltage rise across the charging capacitor. This is also idential with the alternate section, comprising capacitor C90.

Figure 13:
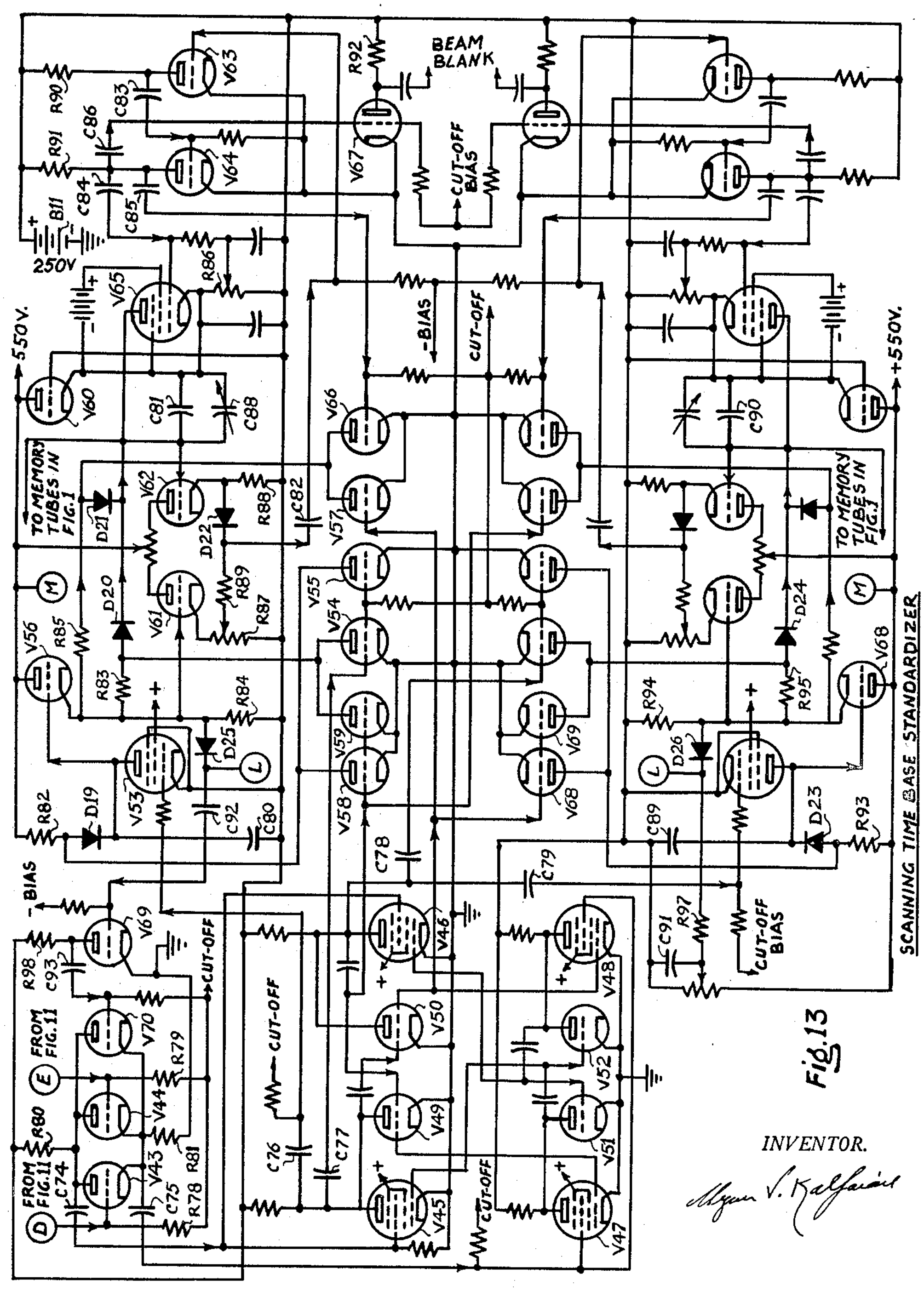
Fig. 13 is a schematic of the scanning system, for transposing the variable time bases of the original wave patterns into a standard time base, by way of associate memory devices of conventional design.

The scanning system as shown in Fig. 13 is designed for cathode ray memory tubes, as available commercially, such for example, the type RK6835/QK464A recording storage tube, made by "Ratheon," or the type #6499, made by "RCA," etc.

*Alternate system of scanning and memory screens*

As described in the foregoing, the purpose of the memory tubes 9 and 10 in Fig. 1 is to record a wave pattern of the sound wave, and to reproduce this recorded wave pattern several times without deterioration of the original wave form. The memory tube must also be capable of erasing the original recorded wave before recording a succeeding wave pattern. While such devices are available commercially in different forms, with different functional characteristics, another possible form is diagrammatically shown in Fig. 14. In this drawing, the memory screen is shown in an exploded view comprising a first layer of translucent conductive electrode 44; a first layer of photoconductive film 45 mounted in electrical contact over the layer 44; two sets of minute conductive strips 46 and 47, mutually insulated and mounted in electrtical contact over the layer of 45; a second layer of photoconductive film 48 mounted in electrical contact over the conductive strips 46 and 47; and a second layer of translucent electrode 49, mounted in electrical contact over the layer of 48. The different layers just mentioned are very thin and require a sturdy base to be mounted on, for mechanical strength. For convenience, this mounting base plate is not shown in the diagram, but it is included in the cross sectional view of Fig. 15, with like numeral indications, wherein, the base plate is shown at 50 which may be of transparent glass, or of plastic material, as may be chosen. Over this base plate is mounted the first translucent electrode 44; next to it is mounted the first photoconductive layer 45; followed by the two sets of conductive strips 46 and 47; over which is mounted the second photoconductive layer 48; and finally is mounted the second translucent electrode 49.

Figures 14, 15:
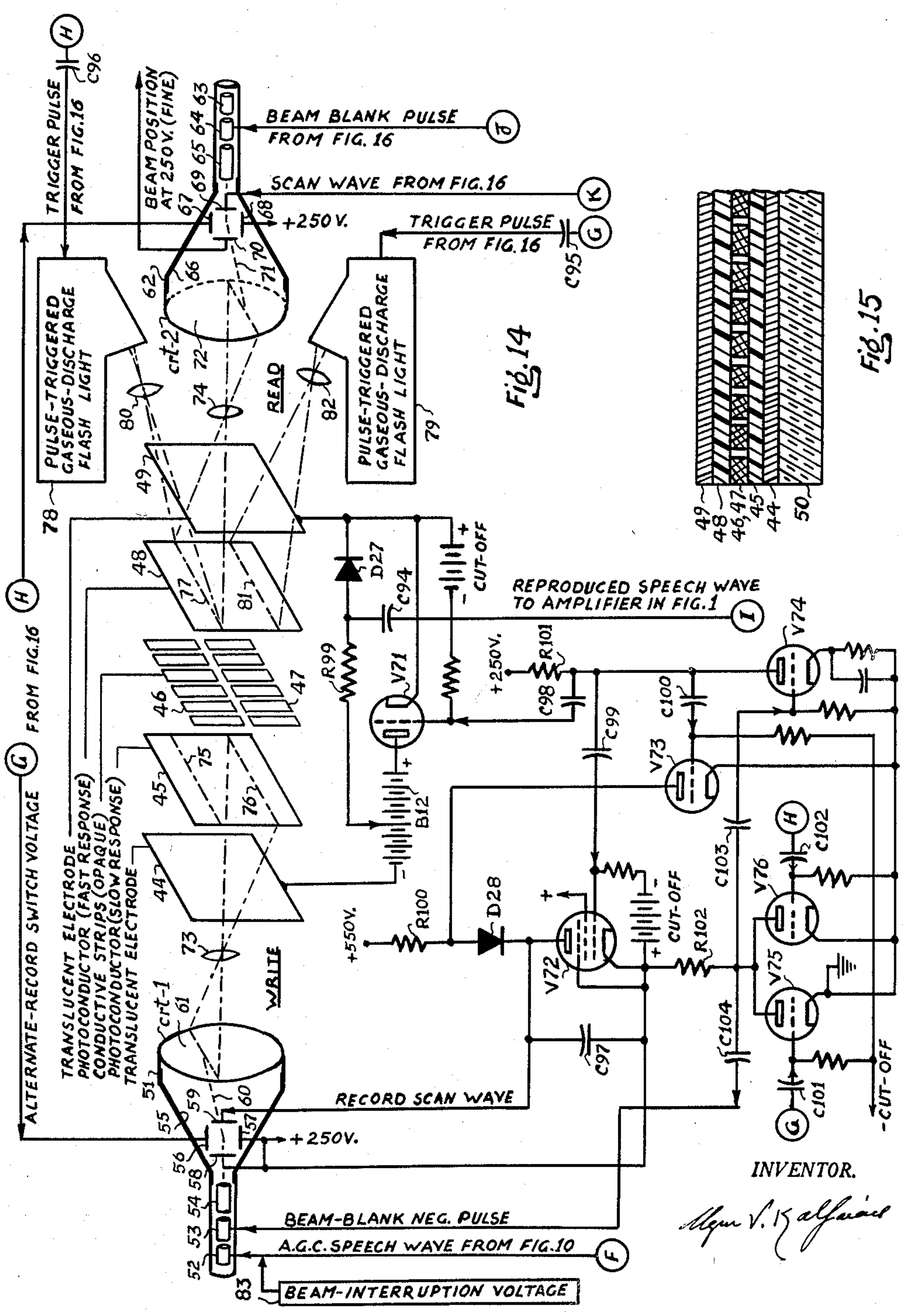
Fig. 14 is a diagram of the memory device of unconventional design, by which means the original wave patterns of the sound waves are recorded and reproduced under control of the scanning system.
Fig. 15 is a cross-sectional view of the memory screen.

Referring back to the memory screen, as shown in Fig. 14, the first photoconductive layer 45 is chosen for recording the sound waves, and the second photoconductive layer is chosen for reading the recorded sound waves over layer 44. There are available various types of photoconductor materials, with different response characteristics. For example, it is known that the response of Cadmium Selenide Cdse photoconductors have faster speed than Cadmium Sulphide Cds photoconductors. Thus assuming that a pattern of light spots of different intensities have fallen upon the photoconductor layer 45, the internal resistance at those spots of this layer decrease (from a very high normal dark resistance value) proportionally, and hold these various resistive values within some short useful time period before decaying completely to the original high dark resistance value. During the time of resistance changes across photoconductor layer 45, current passage between the electrodes 44 and 49 is prevented by the normal high dark resistance of photoconductor layer 48. However, when a beam of light is projected over the photoconductor layer 48, looking in line with the spots of resistive changes of layer 45, the resistance at this spot of photoconductive layer 48 lowers and current passes between electrode 49; the lowered resistance spot of photoconductive layer 48; one or several of the minute metallic strips 46 or 47 in line with said spots; the lowered resistance spot of the photoconductor layer 45, looking in line with the projected light spot on photoconductor 48; the translucent electrode 44; and through battery B12; load resistor R99; and rectifier diode D27. The amount of current passing through the circuit just mentioned depends upon the resistance changes at the current passing spots of photoconductor layers 45 and 48. Thus, by choosing the photoconductive layer 48 having fast recovery time, the projected light beam may be moved along in line with the spots of resistive changes across slow recovery photoconductor layer 45, and scan the last mentioned spots of resistive changes progressively with proportional currents passing through the load resistor R99. A more detailed description of the function of the memory screen, in connection with the associated parts operable with the system may be given as in the following:

In Fig. 14 there are used two cathode ray tubes of conventional design; one for recording and the other for reading. The recording tube *crt*–1 comprises a vacuum envelope 51; electron beam forming electrode or gun 54; electron beam accelerating anode 55, which may conventionally be formed by graphite coating upon the inner wall of the tube; two pairs of vertical and horizontal electrostatic beam deflecting plates 56, 57 and 58, 59; and an electron beam 60, which is projected upon a luminescing phosphor layer 61, which is coated upon the inner surface of the face plate of this cathode ray tube. The reading cathode ray tube *crt*–2 may be of the recording type, and comprises vacuum envelope 62; electron producing cathode element 63; electron intensity control element 64; electron beam forming anode or gun 65; beam accelerating anode which may conventionally be in the form of graphite coating upon the inner surface of the vacuum envelope; vertical and horizontal beam deflecting electrostatic plates 67, 68 and 69, 70; and an electron beam 71 which is projected upon luminescent phosphor layer 72 of this cathode ray tube.

The amplitude controlled sound waves from block 3 in Fig. 1, or from the output terminal (F) of the detailed arrangement, as shown in Fig. 10, is applied upon the cathode element 52 of *crt*–1, for the control of the electron intensity according to the sound waves. By this electron intensity control, the phosphor screen 61 will glow in different light values as the beam scans a line across the phosphor screen. The luminescent light produced upon the phosphor screen 61 is projected upon the slow recovery photoconductor layer 45, through the translucent electrode 44 and by way of the mechanical lens system 73. Thus when the sound modulated electron beam 60 of *crt*–1 scans a line across the phosphor screen 61, this screen will luminesce in light intensities proportionally corresponding to said modulations, and further, a line of resistive changes in proportional values will be stored upon the photoconductor layer 45. For alternate recording, the square wave voltages at terminal (G) of the flip-flop circuit of modified scanning system in Fig. 16, to be described further, are applied to the vertical deflection plates 56 and 57, connected to terminal (G), so that each time said flip-flop changes its state of conductance, the electron beam 60 shifts its position of normal flow either in upper position or in lower position. Thus the recording upon photoconductor layer 45 continues in alternate positions from wave pattern to wave pattern, and these alternate positions fall in line alternately with the two sets of metallic strips 46 and 47. These two sets of metallic strips could be made of randomly distributed metallic particles, but in this case, the light beams of both recorder *crt*–1 and *crt*–2 would have to be accurately aligned in vertical positions, by either one of the lenses 73 and 74, so that the reading beam will accurately fall in position looking at the recorded line. By the two sets of strips, however, the vertical positions of the two light beams could have wide limits of variations.

In operation, assume that the recording beam 60 of *crt*–1 has just finished recording a wave pattern at line 75 on the surface of photoconductor 45, and a square wave voltage upon the vertical deflection plate 56 has just arrived from terminal (G) to shift its position upon the alternate line 76 for recording the succeeding wave pattern of the sound wave. Simultaneously, the output terminal (H) of the flip-flop circuit in Fig. 16 applies a square wave voltage upon the vertical deflection plate 67 of reading *crt*–2, by way of terminal (H), and the position of the reading beam 71 is shifted downwards. Due to the divergence through lens 74, the reading beam position is shifted upwards again and projected upon line 77 of the reading photoconductor layer 48, whereby reading the recorded line 75 of recording photoconductor layer 45. Thus, at each change of square wave potential at the terminals (G) and (H) the beam of *crt*–1 records a succeeding wave pattern of the sound waves, and the beam of *crt*–2 reads a previously recorded wave pattern of the sound waves. The output read sound waves are produced in the load resistor R99, the signal waves of which are applied to the amplifier 11 in Fig. 1, through coupling capacitor C94, by way of the common terminals (I) in both figures; in this case the amplifier 11 receiving the sound waves from the memory devices of Fig. 14, instead of the memory tubes 9 and 10 in Fig. 1.

During a new recording upon the photoconductive layer 45, it is essential that the previous recording has been erased. Due to the slow recovery characteristics of this photoconductor, however, some external means for quenching it is required. It is known that application of infra red light quenches the stored phenomena. Another way of quenching this storage is to apply high voltage for passing high current through the stored area. This latter action might be preferable, and the additional parts necessary for this operation are: the higher voltage terminal of battery B12; normally inoperative electron tube V71; and pulse-triggered gaseous-discharge light sources in blocks 78 and 79. Gaseous-discharge light devices are used in many fields of electronics, for example, the commonly known strobotron. These devices may be triggered by input pulses of short duration for producing pulses of intense light. The flash of light produced in block 78 is projected upon read line 77 of photoconductor 48, through lens 80, and the flash of light produced in block 79 is projected upon read line 81 of this photoconductor, through lens 82. These flash-light sources are triggered by positive pulses from the flip-flop circuit in Fig. 16, for example, from the terminals (G) and (H), through coupling capacitors C95 and C96, in Fig. 14. These connections, of course, are so arranged that, when the read line 77 on photoconductor 48 is to be read the flash-light source 79 is triggered, and when read line 81 is to be read the flash-light source 78 is triggered for operation.

Assuming at one time that the flash-light source 79 is triggered for operation, the read line 81 is illuminated, so that this whole line-area of the photoconductor 48 becomes low resistance. During the triggered period of block 79, a positive pulse is simultaneously applied upon the control grid of normally inoperative tube V71, which becomes conductive and allows current to pass from the high voltage terminal of battery B12 and through translucent electrodes 44 and 49; between the entire read line area 81 and record line 76; thus erasing the previous storage of resistivity changes on line 76 of the normally slow decay photoconductor 45. Since the cathode ray tube *crt*–2 is used for reading the stored signal, its beam intensity is made constant without modulation. This beam, however, is blanked during retrace period, as this beam may read a recorded wave pattern several times before shifting its position to read the succeeding recorded wave pattern. The electron beam of cathode ray tube *crt*–1 may or may not be blanked during retrace period, as it alternates on different position at each recording sequence and does not pass over a recorded line during retrace period.

When recording is desired in distinct dots side by side along a scanning line, the electron beam of the recording cathode ray tube *crt*–1 may be interrupted by a high frequency wave, for example, by block 83; but it is not essential with the memory screen given in Fig. 14, and accordingly, the block 83 may be dispensed with, if so desired. For output signal production, the rectifier diode D27 is not necessary, and the load resistor R99 may be directly connected to the translucent electrode 49. The diode D27, however, is included in the arrangement, so as to prevent current passage through load resistor R99 when the normally idle tube V71 starts conducting. When the rectifier diode D27 is eliminated, conventional feedback systems may be utilized for cancelling out the pulse signal produced across R99 during current passage through V71. Both diode D27 and gate tube V71 may be eliminated by illuminating the photoconductor 45 instead of the photoconductor 48. In this case, the blocks 78 and 79 would have to produce red light for quenching the layer 45.

The horizontal scanning saw tooth voltage upon the deflection plate 59 of recording cathode ray tube *crt*–1 is obtained from across storage capacitor C97, which is charged through rectifier diode D28 in series with timing resistor R100. For retrace discharge, a positive pulse is applied upon the control grid of normally inoperative discharger tube V72, which becomes conductive and discharges the capacitor C97. In order to make the discharge of C97 complete, a positive pulse is simultaneously applied upon the control grid of normally inoperative tube V73, which becomes conductive and draws plate current through resistor R100, lowering the potential at anode terminal of D28 below the cathode potential of V72. The positive pulses upon the control grids of normally inoperative tubes V71—V73 are applied through the coupling capacitors C98—C100, respectively, the voltages of which are obtained from across plate circuit resistor R101 of electron tube V74. These last mentioned pulses are originally derived from the flip-flop circuit in Fig. 16, from the output terminals (G) and (H) which are connected common to the terminals (G) and (H) in Fig. 14, further coupled to the control grids of normally inoperative tubes V75 and V76 through small pulse-forming coupling capacitors C101 and C102. Thus, whichever of tubes V75, V76 receives a positive pulse upon its control grid, it draws plate current through the common plate circuit resistor R102 and produces a negative pulse across it, which is further applied upon the control grid of tube V74 through coupling capacitor C103, thus lowering the normal plate conductance of V74 for the required production of positive pulses at its plate circuit resistor R101. The negative pulse produced across common plate circuit resistor R102 of tubes V75 and V76 is applied upon the electron intensity control element 53 of *crt*–1, through coupling capacitor C104 for blanking the beam during retrace period. But as mentioned above, this beam blanking pulse may be eliminated, if so desired, as during retrace period the recording beam shifts its position to an alternate recording position and does not fly back on recording line. The beam blanking negative pulse upon the electron intensity control element 64 of read cathode ray tube *crt*–2 is obtained from the terminal (J) in common connection with the terminal (J) in Fig. 16. Similarly, the saw-tooth scan voltage upon the horizontal deflection plate 69 of *crt*–2 is obtained from the terminal (K) which is electrically connected with the terminal (K) in Fig. 16. Further, the voltage applied upon the horizontal beam deflection plate 70 of *crt*–2 is adjusted manually (the necessary component parts not shown for simplicity of drawing) so as to position the starting point of the projected beam coincident with the starting point of the projected beam of recording cathode ray tube *crt*–1. Of course, such an adjustment may also be made mechanically by either one of the lenses 73 or 74.

*Modified scanning system*

Figure 16:
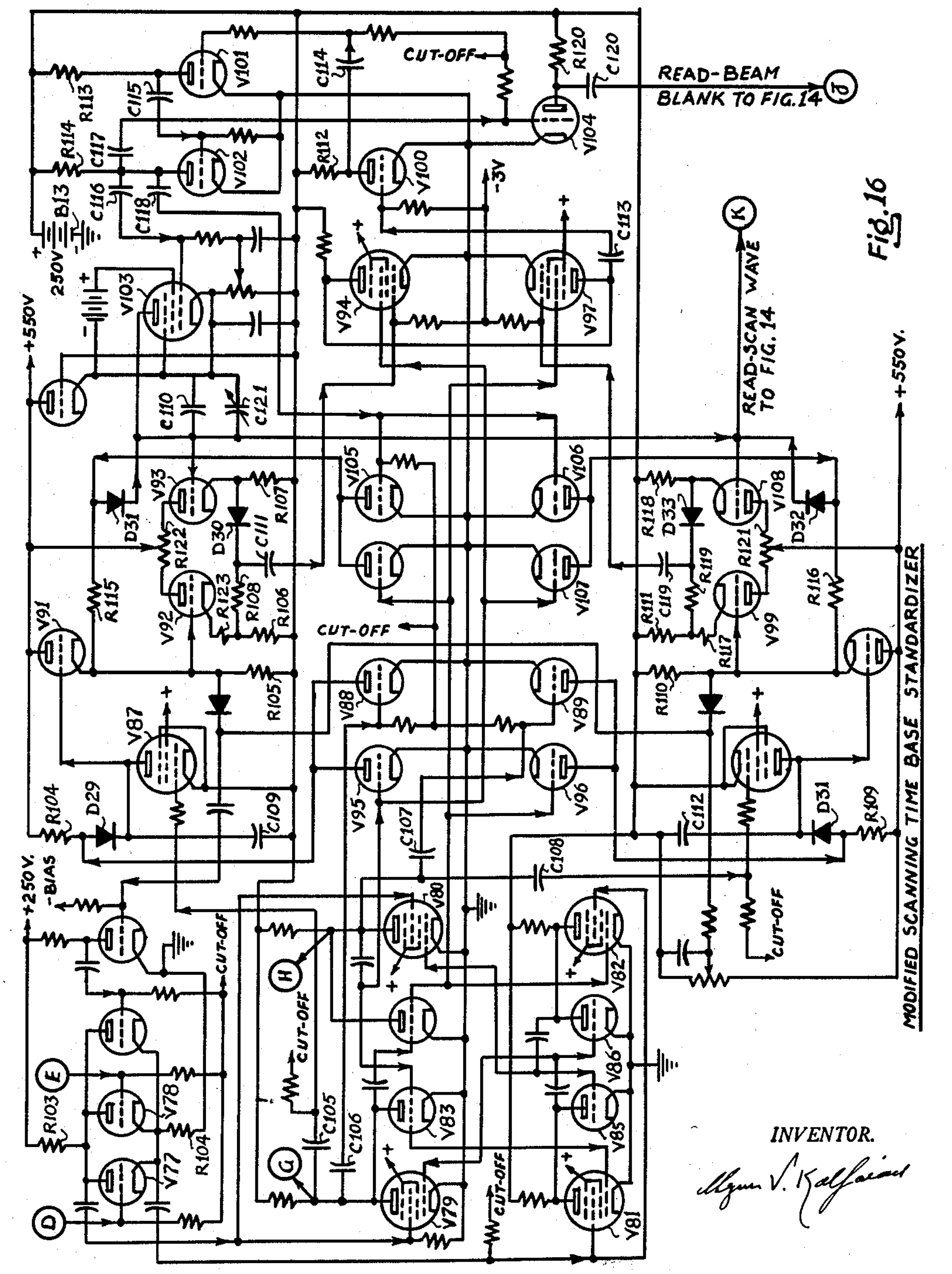
Fig. 16 is a modification of the scanning system given in Fig. 13, the former of which is particularly arranged to be used in conjunction with the memory device of Fig. 14.

The scanning system had been described in the foregoing by way of the schematic arrangement in Fig. 13. When the memory screen as shown in Fig. 14 is desired to be utilized, however, the scanning system in Fig. 13 may be modified in the form of the arrangement given in Fig. 16. In this latter arrangement, the normally inoperative mixer tubes V77 and V78 are excited by alternate positive pulses from terminals (D) and (E), which are connected electrically to the control grids of mixer tubes V28 and V29 at terminals (D) and (E) in Fig. 11, respectively. The control grids of these four mixer tubes, at terminals (D) and (E) receive alternate positive pulses from the output terminals (A) and (B) of flip-flop circuit in Fig. 9. As the mixer tubes V77 and V78 are driven to conductance by the alternate positive pulses upon their control grids, simultaneous negative and positive pulses appear in the common plate circuit resistor R103 and common cathode circuit resistor R104, respectively, which are applied upon the parallel connected second control grids of mixer tubes V79, V80, and the parallel connected second control grids of mixer tubes V81, V82, respectively. The mixer tubes V79—V82, in combination with the trigger tubes V83—V86, constitute a flip-flop circuit, such as the flip-flop circuits shown in Fig. 9 comprising tubes V15—V20, and in Fig. 13 comprising tubes V45—V52, the function of which had been described in the foregoing. The operation of the scanning system in Fig. 16 is as follows:

Starting from an arbitrary operating point, assume that the trigger tube V84 has just stared conducting and the trigger tube V83 non-conducting. At this starting point, the exciter tube V79 becomes non-conductive producing a positive pulse through its plate circuit coupling capacitors C105, C106, and exciter tube V80 becomes conductive producing a negative pulse through its plate circuit coupling capacitors C107, C108. The positive pulse produced through coupling capacitor C105 is applied upon the control grid of normally inoperative discharger tube V87, which becomes conductive during the short pulse period and discharges capacitor C109 from a previously stored charge. During this discharge period, the positive pulse produced through coupling capacitor C106 is applied upon the control grid of normally inoperative tube V88, which becomes conductive during the short input pulse time and draws plate current through resistor R104; dropping the voltage at anode terminal of rectifier idode D29 below the potential of battery B13, so as to render the discharge of capacitor C109 substantially complete. Simultaneously with the short positive pulses just mentioned, there is produced a short negative pulse through coupling capacitors C107 and C108, which are applied upon the control grids of normally inoperative tubes V89 and V90, rendering no useful results at this time.

When the stored voltage across capacitor C109 is discharged, the reduced positive potential upon the control grid of cathode follower tube V91 in turn reduces the positive potential from across its cathode circuit resistor R105 upon the control grid of cathode follower tube V92, which further reduces the positive potential across its cathode circuit resistor R106. In the event that at this time there is some storage in the storage capacitor C110, the positive potential of this capacitor applied upon the control grid of cathode follower tube V93 renders the potential across cathode circuit resistor R107 of this tube more positive than the potential across resistor R106, and accordingly, current flows through rectifier diode D30 in series with resistor R108 with positive pulse being transmitted through coupling capacitor C111 to the first control grid of dual control-grid tube V94. During this time, however, the control grid of trigger tube V83 has received plate current cut-off negative potential, which is directly applied upon the second control grid of dual grid-control tube V94, rendering its plate circuit inoperative. This negative potential from the control grid of trigger tube V83 is simultaneously applied upon the control grid of tube V95, which becomes inoperative and allows the capacitor C109 to start charging through diode D29 in series with the timing resistor R104; after the positive pulse from coupling capacitor C106 has ceased from being impressed upon the control grid of tube V88.

The cathode potential assumed upon the control grid of trigger tube V84 is directly applied to the control grid of tube V96 and upon the second control grid of dual control-grid tube V97. The tube V96 becomes conductive and draws current through the resistor R109; lowering the potential at anode terminal of diode D31 below the potential of battery B13, and accordingly, stopping the charging action of capacitor C112. Thus, when the capacitor C109 starts charging, the capacitor C112 stops charging. The stored potential across capacitor C112 is applied upon the control grid of cathode follower tube V98, which accordingly develops proportional potential across its cathode circuit resistor R110, and further developing similar potential across the cathode circuit resistor R111 of cathode follower tube V99, by direct connection of R110 to the control grid of tube V99. During this operational setting, the cathode potential impressed upon the second control grid of tube V97 from across the control grid of conducting trigger tube V84, raises the plate current of tube V97 the sudden rise of which produces a negative pulse through coupling capacitor C113 and applied upon the control grid of amplifier tube V100. This negative pulse is changed to positive pulse in the plate circuit resistor R112, and again changed to positive pulse in the plate circuit resistor R113 of tube V101, by way of coupling capacitor C114 from resistor R112 to the control grid of tube V101. The negative pulse in the plate circuit resistor R113 of tube V101 is applied upon the control grid of tube V102 through coupling capacitor C115. The plate current of this latter tube lowers by the negative input, and a final positive pulse is applied, from its plate circuit resistor R114, upon the control grid of normally inoperative discharger tube V103, through coupling capacitor C116; upon the control grid of normally inoperative tube V104, through coupling capacitor C117; and upon the parallel connected control grids of normally inoperative tubes V105 and V106. The function of this multiple operation is that: first, the discharger tube V103 becomes conductive and discharges capacitor C110 from its previous storage; and second, the tubes V105 and V106 become conductive and draw currents through resistors R115 and R116 independently, lowering the potentials at anode terminals of diodes D31 and D32 below the potential of battery B13, so as to render the discharge of C110 as complete as possible. At this time, the steady state negative potential assumed upon the control grid of trigger tube V83 is directly applied upon the control grid of tube V107, which becomes non-conductive and restores the anode potential of diode D32 equal to the cathode potential of V98.

With the above given initial setting, the capacitor C110 now starts charging linearly (during the first 67 percent of the total charge) through diode D32 in series with the timing resistor R116. This linear charge across capacitor C110 represents the *read* scan voltage, which is applied from terminal (K) to the terminal (K) in Fig. 16. The cathode signal potential of V98 is applied upon the control grid of cathode follower tube V99, a proportional signal potential appearing across the series connected cathode circuit resistors R111, R117 of this tube, and the saw-tooth voltage across capacitor C110 is applied upon the control grid of cathode follower tube V108, a proportional potential appearing across the cathode circuit resistor R118 of this tube.

The voltage rise limit across the capacitor C110 is determined by the voltage dividing resistor R117 in series with R111 in the cathode circuit of V99. The values of R111 and R117 are so proportioned that when the cathode potential of V108 reaches 67 percent of the cathode potential of V99, current passes through diode D33 in series with resistor R119, producing a positive signal potential which is applied upon the first control grid of tube V97 through coupling capacitor C119. This effects a positive pulse upon the control grid of discharger tube V103, by way of the series of couplings as described above, which becomes conductive and discharges capacitor C110, for repeat generation of saw-tooth scan voltages at terminal (K), until the flip-flop circuit changes its state of conduction and the capacitor C110 starts charging at this time through diode D31 in series with resistor R115 in accordance with the voltage developed across cathode circuit resistor R105 of cathode follower tube V91, proportionally to the stored potential across capacitor C109, representative of the time period of a succeeding wave pattern of the sound waves. When the normally non-conductive tube V104 receives a positive pulse upon its control grid, it transmits a large negative pulse from its plate circuit resistor R120 and coupling capacitor C120, to the output terminal (J) which is connected to the beam intensity control element 64 of *crt*–2, in Fig. 14, for blanking the beam during retrace period of scanning. The variable capacity C121 in parallel with the storage capacity C110, in Fig. 16, is included for the purpose of tuning the rise time of the saw-tooth voltage accurately. Also, the potentiometers R121 and R122 in the plate circuits of cathode follower tubes V99, V108 and V92, V93, respectively, are included for balancing the conductance of these tubes. These potentiometers, however, are not absolutely necessary, as these adjustments may be made by the resistors R118, R107, or by the series connected resistors R111, R117, and R106, R123. These adjustments also refer to the same component parts as shown in the arrangement of Fig. 13.

By comparison of the scanning arrangements given in Figs. 13 and 16, it will be observed that both the recording and reading scan saw-tooth voltages in Fig. 13 are obtained from the same storage capacitor, for example, capacitor C81, or alternately operating capacitor C90. Whereas in Fig. 16, the reading saw-tooth scan voltages are obtained continuously from the storage capacitor C110, and the recording saw-tooth scan voltages are obtained continuously from the storage capacitor C97 in Fig. 14. The scanning circuit arrangement in Fig. 13, however, may be used for the memory screen arrangement given in Fig. 14 by a slight modification, for example, by using two cathode ray tubes, each acting both as recorder and reader, and a separate memory screen associated with each one of these cathode ray tubes. Describing only one section as typical of the replica alternate system in the latter arrangement, the cathode ray tube *crt*–1 would act as both recorder and reader of the sound wave patterns by the inclusion of a mirror system, such that, during recording time the modulated luminescent line of light on the phosphor screen of *crt*–1 would fall directly on the recording surface of the memory screen, and during reading time the unmodulated luminescent line of light on said phosphor screen would shift its position, by a shifting voltage applied upon the vertical deflection plates of *crt*–1, and fall on the reading surface of the memory screen through said mirror system. In this case, the electron intensity control element 53 of *crt*–1 would be switched to sound wave modulation during recording time, and to steady state during reading time. Also, each memory screen would have only one set of metallic strips, instead of the two sets as indicated by the numerals 46 and 47 of the dual purpose screen in Fig. 14. Further, each memory screen would be associated with a pulse-triggered gaseous-discharge light source, such as shown by the blocks 78 and 79, with similar functional operation as described in the foregoing in connection with the arrangement of Fig. 14. Still further, the double-beam arrangement of Fig. 14 may be substituted by the "Graphechon" or "Metrechon" storage tubes, as described in the RCA Review, March 1949, pp. 59–73, and June 1954, pp. 145–162, respectively.

As this particular modification suggests various other modifications of the entire system, it is also worth while to make reference to the major peak selector in Fig. 9. Due to its peculiar operating characteristics, this circuit sometimes responds to the second harmonics of the wave patterns of the speech sound waves. This condition will cause production of the frequency transposed speech sound waves at twice the standard fundamental frequency. While this condition is not serious, as accurate selection of one or two wave patterns from the trains of successive wave patterns will suffice for accurate phonetic sound analysis, two sets of resonant circuits may be included in the final arrangement; one set operating at the standardized resonances, and the other set operating at twice the standardized resonances. Still further, and in reference to the characteristics of phonetic sound waves, some of the sounds can be recognized by selecting the predetermined resonances from the frequency-transposed phonetic sound waves, without necessity of pre-fixed amplitude adjustments. Accordingly, the system will operate without these pre-fixed amplitude adjustments according to the particular requirements, if so desired. Furthermore, the recording and reading of the wave patterns in the process of frequency-transposition do not have to be contiguous, and only a single recording and reading apparatus may be employed for periodic operation, instead of contiguous operation, if so desired.

In reference to the exemplary modifications as suggested in the paragraph supra, and in view of the numerous systems and circuitry involved in the present invention, it will be obvious to the skilled in the art that, various substitutions of parts, adaptations and modifications are possible without departing from the spirit and scope thereof.

What I claim is:

1. In spoken sound waves where each phonetic sound is identified by a group of resonances having definite frequency ratios and approximate amplitude levels one with another, and wherein the frequency locations of these groups are shifted widely in the entire voice spectrum, the system of identifying these phonetic sounds which comprises means for producing phonetic sound waves; frequency transposer means and means therefor for re-shifting the frequency positions of said grouped resonances to standard frequency locations; grouped resonant circuits and means therefor for selecting these grouped resonances from said frequency transposed resonances; grouped detector means associated with each of said grouped resonant circuits, for detecting said resonances; substantially fixed amplitude ratio adjustments with said grouped detector means corresponding proportionally to the approximate amplitude levels aforesaid; grouped switching means associated with said grouped detector means, operatively responsive to the approximate amplitude values of said fixed amplitude ratio adjustments; singular switching means associated with each of said grouped switching means operatively responsive to the total operating action of the associate grouped switching means; and means for translating the switching action of each of said singular switching means into visible intelligible indicia representative of a predetermined phonetic sound.

2. Where spoken sounds are produced in wave trains and wherein each phonetic sound is identified by a group of resonances having definite frequency ratios and approximate amplitude levels one with another, but wherein the peak amplitude of the wave trains and the frequency locations of these groups of resonances are shifted widely in the entire voice spectrum, the system of identifying these phonetic sounds which comprises means for producing phonetic sound waves; frequency transposer means and means therefor for re-shifting the frequency positions of said grouped resonances to standard frequency locations; automatic amplitude control means and means therefor for controlling the peak amplitude of said wave trains of the frequency-transposed sound waves to substantially a standard peak value; grouped resonant circuits and means therefor for selecting the grouped resonances from said amplitude controlled frequency-transposed waves; grouped detector means associated with each of said grouped resonant circuits, for detecting said resonances; substantially fixed amplitude ratio adjustments with said grouped detector means corresponding proportionally to the approximate amplitude levels aforesaid; grouped switching means associated with said grouped detector means, operatively responsive to the approximate amplitude values of said fixed amplitude ratio adjustments; singular switching means associated with each of said grouped switching means operatively responsive to the total operating action of the associate grouped switching means; and means for translating the switching action of each of said singular switching means into visible intelligible indicia representative of a predetermined phonetic sound.

3. Where spoken sounds are produced in wave trains and wherein each phonetic sound is identified by a group of resonances having definite frequency ratios and approximate amplitude levels one with another, but wherein the peak amplitude of the wave trains and the frequency locations of these groups of resonances are shifted widely in the entire voice spectrum, the system of identifying these phonetic sounds which comprises means for producing phonetic sound waves; frequency transposer means and means therefor for re-shifting the frequency positions of said grouped resonances to standard frequency locations; automatic amplitude control means and means therefor for controlling the peak amplitude of said wave trains of the frequency-transposed sound waves to substantially a standard peak value; grouped resonant circuits and means therefor for selecting the grouped resonances from said amplitude controlled frequency-transposed waves; grouped detector means associated with each of said grouped resonant circuits, for detecting said resonances; substantially fixed amplitude ratio adjustments with said grouped detector means corresponding proportionally to the definite amplitude levels aforesaid; grouped switching means associated with said grouped detector means, operatively responsive to the approximate amplitude values of said fixed amplitude ratio adjustments; singular switching means associated with each of said grouped switching means operatively responsive to the total operating action of the associate grouped switching means; means for translating the switching action of each of said singular switching means into printed symbols representative of pre-assigned phonetic sounds; and means for advancing the spacing between each group of printed symbols representative of a spoken word, whereby effecting word separation of the printed symbols.

4. The system as set forth in claim 3, wherein said means for advancing the spacing between each group of printed symbols comprises a timing means for measuring the time of quiescence that may occur between spoken words; a limited timing adjustment means with said measuring means; a switching means operatively responsive to said limited timing adjustment; and means for applying the switching action of last said means for the advancement of spacing aforesaid.

5. The system as set forth in claim 3, wherein said means for advancing the spacing between each group of printed symbols comprisese means for selecting said wave trains; means for deriving pulse voltages of substantially constant amplitude at terminations of said selected wave trains; a storage means having a decay time constant longer than the longest time period in which a wave train may ocur; means for storing said derived pulse voltages in said storage means; a switching means operatively responsive to said storage; and means for converting the idle action of last said switching means into the spacing between printed symbols aforesaid.

6. Where spoken sounds are produced in wave trains and wherein each phonetic sound is identified by a group of resonances having definite frequency ratios and approximate amplitude levels one with another, but wherein both the amplitude and time periods of the wave trains vary randomly, the system of identifying these phonetic sounds which comprises means for producing phonetic sound waves; stepwise amplitude control means for equalizing the peak amplitudes of said wave trains train-by-train; means for pre-assigning a standard time base for said wave trains, and means therefor for variably compressing the time periods of said amplitude controlled wave trains so as to have the same time base as the pre-assigned time base and to standardize both the amplitudes and frequency regions in which said groups of resonances are produced; amplifier means and means therefor for amplifying said amplitude and time-base controlled wave trains; grouped resonant circuits and means therefor for selecting the grouped resonances from said amplified waves; grouped detector means associated with each of said grouped resonant circuits, for detecting said resonances; substantially fixed amplitude ratio adjustments with said grouped detector means corresponding proportionally to the approximate amplitude levels aforesaid; grouped switching means associated with said grouped detector means, operatively responsive to the approximate amplitude levels of said fixed amplitude ratio adjustments; singular switching means associated with each of said grouped switching means operatively responsive to the total operating action of the associate grouped switching means; means for translating the switching action of each of said singular switching means into printed symbols representative of preassigned phonetic sounds; and means for advancing the spacing between each group of printed symbols representative of a spoken word, whereby effecting word separation of the printed symbols.

7. The system as set forth in claim 6, wherein said stepwise amplitude control means comprises means for selecting said wave trains and means therefor for producing marker pulses at terminations of said wave trains; gain-controllable amplifying means having first and second input terminals and an output terminal; means for applying said wave trains to the first input terminal of said amplifying means; means for splitting the phase at the output terminal of last said means, in positive and negative polarities; a standard peak-limiting bias source and rectifier means for deriving output negative signals from last said phase-split output in positive and negative polarities, only after exceeding in amplitude of the peak-limiting bias source; a storage means having a decay time constant longer than at least twice the time period of the longest wave train occurring in spoken sounds, and means therefor for storing said derived output signals; means for applying said stored negative signals upon the second input terminal of said amplifying means for reducing the gain of same until the amplitude of said phase-split output is equal to said bias source; a normally inoperative discharger means associated with said storage means; and means for applying said marker pulses upon the discharger means for operation of same, whereby effecting discharge of the storage means at terminations of the wave patterns, and thereby effecting said stepwise amplitude control of the wave patterns.

8. The system as set forth in claim 6, wherein, said amplitfier means comprises an amplifier means having an output terminal; a gain-controllable amplifying means having first and second input terminals and an output terminal; an impedance means at last said output terminal, having a signal amplitude dividing terminal; means for applying the output terminal of the amplifying means to the first input terminal of the gain-controllable amplifier means, for amplifying same in said impedance means; means for splitting the phase of the signal at the signal amplitude dividing terminal across said impedance means, in positive and negative polarities; a standard peak-limiting bias source and rectifier means for deriving output negative signals from last said phase-split output in positive and negative polarities, only after exceeding in amplitude of the peak-limiting bias source; a storage means having a decay time constant longer than at least twice the time period of the longest wave train occurring in spoken sounds, and means therefor for storing said derived output signals; means for applying said stored negative signals upon the second input terminal of said gain-controllable amplifying means for reducing the gain of same until the amplitude of said phase-split signal is equal to said bias source; and means for selecting said grouped resonances by said grouped resonant circuits from the total amplified signal appearing across said impedance means.

9. The system as set forth in claim 6, wherein, said means for variably compressing the time periods of said wave trains to a standard time period comprises means for selecting said wave trains; means for deriving marker pulses at terminations of said wave trains; a potential source; a storage means of electrical quantities, having a suitably predetermined rise time constant representative of a normal recording time base; on-and-off first coupling path between said potential source and the storage means; a normally inoperative discharger means and means therefor for rendering it operative by the first of said marker pulses for discharging previously stored electrical quantity in said storage means; means for rendering said coupling path in the on-position immediately after the ending of the first of said marker pulses, whereby starting storage of electrical quantity at a rising time depending upon said time constant; a recording means under control of the rising potential across said storage means; first switching means for the on-and-off operation of said recording means, and means therefor for starting to record a first selected wave train during rise time of said storage; means for rendering said first coupling path in the off-position at the arrival of the second of said marker pulses, whereby stabilizing the electrical quantity stored in said storage means, and thereby terminating said recording; a generating means for generating electrical time base waves at said standard time base, its amplitude being under control of said stabilized storage; on-and-off second coupling path between the storage means and said generator means, and means therefor for rendering said second coupling path in the on-position immediately after the ending of the second of said marker pulses, whereby generating time base waves; a reproducing means under control of the generated standard time base waves; and second switching means for the on-and-off operation of said reproducing means, and means therefor for rendering it in the on-position for starting to reproduce said recorded wave train during the time period of the second selected wave train.

10. The system as set forth in claim 6, wherein said means for variably compressing the time periods of said wave trains to a standard time period comprises means for selecting said wave trains; means for deriving marker pulses at terminations of said wave trains; a potential source; a first storage means of electrical quantities, having a suitably predetermined rise time constant; on-and-off first coupling path between said potential source and the storage means; first normally inoperative discharger means and means therefor for rendering it operative by the first of said marker pulses for discharging previously stored electrical quantity in said first storage means during the first of said marker pulses; means for rendering said coupling path in the on-position immediately after the ending of the first of said marker pulses, whereby starting storage of electrical quantity at a rising time depending upon said time constant; a second storage means of electrical quantities having a rise time constant equal to said standard time base; first and second on-and-off buffer coupling paths between the first and second storage means; first and second switching means associated with the first and second buffer coupling paths, respectively; means for pre-adjusting said first buffer coupling path so that only a predetermined ratio of the rising potential in the first storage is transferred to the second storage means; means for preadjusting said second buffer coupling path so that the ratio of charge in the second storage means rises at said standard time base; means for rendering the first switching means in the on-position immediately after said first marker pulse, while the second switching means is in the off-position, whereby transferring the rising potential in said first storage means to said second storage means at said predetermined amplitude ratio; a recording means under control of the rising potential in said second storage means; a third switching means for the on-and-off operation of said recording means, and means therefor for rendering it in the on-position for starting to record a first selected wave train during rise time of the second storage means; means for rendering said first coupling path in the off-position at the arrival of the second of said marker pulses, whereby stabilizing the electrical quantity stored in the first storage means, and thereby terminating said recording; a normally inoperative second discharger means associated with the second storage means, and means therefor for rendering the second discharger means operative by said second of the marker pulses for discharging the stored quantity in the second storage means during said pulse; means for rendering said first and second switching means in the off and on positions, respectively, whereby allowing re-charge of the second storage means through said second buffer coupling path at the rising rate of said standard time base; a reproducing means under control of the rising potential in said second storage means; and a third switching means associated with the reproducing means, and means therefor for rendering the reproducing means in the on-position during the charging of said second storage means through said second buffer coupling path, whereby reproducing the recorded wave train at said standard time base.

11. The system as set forth in claim 6, wherein said means for variably compressing the time periods of said wave trains to a standard time period comprises means for selecting said wave trains; means for deriving marker pulses at terminations of said wave trains; a potential source; a first storage means of electrical quantities, having a suitably predetermined rise time constant; on-and-off first coupling path between said potential source and the storage means; first normally inoperative discharger means and means therefor for rendering it operative by the first of said marker pulses for discharging previously stored electrical quantity in said first storage means during the first of said marker pulses; means for rendering said coupling path in the on-position immediately after the ending of the first of said marker pulses, whereby starting storage of electrical quantity at a rising time depending upon said time constant; a second storage means of electrical quantities having a rise time constant equal to said standard time base; first and second on-and-off buffer coupling paths between the first and second storage means; first and second switching means associated with the first and second buffer coupling paths, respectively; means for preadjusting said first buffer coupling path so that only a predetermined ratio of the rising potential in the first storage is transferred to the second storage means; means for pre-adjusting said second buffer coupling path so that the rate of charge in the second storage rises at said standard time base; means for rendering the first switching means in the on-position immediately after said first marker pulse, while the second switching means is in the off-position, whereby transferring the rising potential in said first storage means to said second storage means at said predetermined amplitude ratio; a recording means under control of the rising potential in said second storage means; a third switching means for the on-and-off operation of said recording means, and means therefor for rendering it in the on-position for starting to record a first selected wave train during rise time of the second storage means; means for rendering said first coupling path in the off position at the arrival of the second of said marker pulses, whereby stabilising the electrical quantity stored in the first storage means, and thereby terminating said recording; a normally inoperative second discharger means associated with the second storage means, and means therefor for rendering the second discharger means operative by said second of the marker pulses for discharging the stored quantity in the second storage means during said pulse; means for rendering said first and second switching means in the off-and-on positions, respectively, whereby allowing re-charge of the second storage means through said second buffer coupling path at the rising rate of said standard time base; a reproducing means under control of the rising potential in said second storage means; a third switching means associated with the reproducing means, and means therefor for rendering the reproducing means in the on-position during the charging of said second storage means through said second buffer coupling path, whereby reproducing the recorded wave train at said standard time basis; means for dividing and terminating the rising potential of said first storage means at the said predetermined ratio of the peak rising potential transferred from the first to the second storage means; a third buffer coupling path between last said terminated potential and the rising potential in said second storage means, so undirectionally polarized that, current flows through it only when the rising potential in said second storage means is higher than said terminated potential; and means for producing an output pulse during current flow through said third buffer coupling path, and means therefor operatively associated with said second discharger means for rendering it operative and discharge said second storage means for repeat recharging and repeat reproducing said recorded wave train until the arrival of the third wave train.

12. Where spoken sounds are produced in wave trains with major peak terminations and wherein each phonetic sound is identified by a group of resonances having definite frequency ratios and approximate amplitude levels one with another, but wherein the peak amplitude of the wave trains and the frequency locations of these groups of the resonances are shifted widely in the entire voice spectrum, the system of identifying these phonetic sounds which comprises means for producing phonetic sound waves; frequency transposer means and means therefor for re-shifting the frequency positions of said grouped resonances to standard frequency locations comprising means for selecting said wave trains; means for assigning a standard time base for these selected wave trains; means for recording said selected wave trains at some normal speed; means for measuring the time differences of these recordings with that of said standard time base; and reproducing means under control of said measurements for reproducing said recorded wave trains in the standard time base, thereby shifting said resonances to standard frequency locations; automatic amplitude control means and means therefor for controlling the peak amplitude of said frequency transposed wave trains to substantially a standard peak value; grouped resonant circuits and means therefor for selecting the grouped resonances from said amplitude controlled frequency-transposed waves; grouped detector means associated with each of said grouped resonant circuits, for detecting said resonances; substantially fixed amplitude ratio adjustments with said grouped detector means corresponding proportionally to the amplitude levels aforesaid; grouped switching means associated with said grouped detector means, operatively responsive to the approximate amplitude levels of said fixed amplitude ratio adjustments; singular switching means associated with each of said grouped switching means operatively responsive to the total operating action of the associate grouped switching means; means for translating the switching action of each of said singular switching means into printed symbols representative of pre-assigned phonetic sounds; and means for advancing the spacing between each group of printed symbols representative of a spoken word, whereby effecting word separation.

13. The system as set forth in claim 12, wherein said means for selecting said wave trains comprises an amplifier means and means therefor for amplifying said produced phonetic sound waves; gain suppressing feedback means operatively associated with the amplifying means and means therefor for feeding back these amplified waves for suppressing the gain of said amplifying means; and gradually decaying unidirectional storage means operatively associated with the gain suppressing means for storing a quantity of said feedback suppression waves, the decaying time constant of said storage means being at least equal to or longer than the wave train having the longest time period, whereby causing suppression-storage of the gain of said amplifying means in larger magnified proportion at said major peaks than at minor peaks of each of said wave train, so as to indicate the arrival or ending of a wave train.

14. The system as set forth in claim 12, wherein said recording and reproducing means comprises a composite screen consisting of a first translucent electrode; a first photoconductive layer adapted to translate optical images into representative electrical resistivity changes having decay time constant longer than the longest time period occurring in said wave trains, and spaced in electrical contact with the surface of the first translucent electrode; a mosaic of mutually insulated conductive elements in electrical contact with the surface of the first photoconductive layer, remote from said first translucent electrode; a second photoconductive layer having response and decay time constant at least equal to or shorter than one cycle period of the highest frequency occurring in said frequency-transposed sound waves, and spaced in electrical contact with said conductive elements remote from the first photoconductive layer; a second translucent electrode spaced in electrical contact with the second photoconductive layer remote from said conductive elements; a potential source and an impedance means connected in series with said first and second electrodes; means for projecting a first scanning optical beam upon said first photoconductive layer through the first translucent electrode; means for modulating the intensity of said beam by said wave train of the spoken sound, whereby producing corresponding storage of changes in resistivity upon the surface of said first photoconductive layer; means for projecting a second scanning optical beam of constant intensity upon the second photoconductive layer through said second translucent electrode, positionally coincident with said first projection; first and second associate switching means for the on-and-off positions of the first and second projected beams, respectively; means for rendering the first and second switching means in on and off positions alternately at the frequency rate of said wave trains, so that while said first scanning beam is in the on-position for recording a wave train the second scanning beam is in the off-position, and while the first scanning beam is in the off-position the second scanning beam is in the on-position for reproducing the recorded wave train by way of passing progressive currents through the first and second electrodes and said impedance means; and means for projecting an optical light of short duration upon the entire surface of said second photoconductive layer through said second translucent electrode just before the on-position of said first scanning beam for erasing the previously stored resistive values upon the surface of said first photoconductive layer, for repeat recording.

References Cited in the file of this patent

UNITED STATES PATENTS

| | | |
|---|---|---|
| 2,705,260 | Kalfaian | Mar. 29, 1955 |
| 2,708,688 | Kalfaian | May 17, 1955 |